US012370596B2

(12) United States Patent
Morijiri et al.

(10) Patent No.: US 12,370,596 B2
(45) Date of Patent: Jul. 29, 2025

(54) BINDING MACHINE

(71) Applicant: MAX CO., LTD., Tokyo (JP)

(72) Inventors: Takeshi Morijiri, Tokyo (JP); Nobutaka Tashima, Tokyo (JP); Shinpei Sugihara, Tokyo (JP)

(73) Assignee: Max Co., Ltd., Tokyo (JP)

( * ) Notice: Subject to any disclaimer, the term of this patent is extended or adjusted under 35 U.S.C. 154(b) by 42 days.

(21) Appl. No.: 17/274,149

(22) PCT Filed: Sep. 5, 2019

(86) PCT No.: PCT/JP2019/035093
§ 371 (c)(1),
(2) Date: Mar. 5, 2021

(87) PCT Pub. No.: WO2020/050388
PCT Pub. Date: Mar. 12, 2020

(65) Prior Publication Data
US 2021/0237143 A1 Aug. 5, 2021

(30) Foreign Application Priority Data
Sep. 7, 2018 (JP) ................................ 2018-168247
Sep. 7, 2018 (JP) ................................ 2018-168248
(Continued)

(51) Int. Cl.
*B21F 15/06* (2006.01)
*B25B 25/00* (2006.01)
*E04G 21/12* (2006.01)

(52) U.S. Cl.
CPC .............. *B21F 15/06* (2013.01); *B25B 25/00* (2013.01); *E04G 21/123* (2013.01)

(58) Field of Classification Search
CPC ............................... E04G 21/123; B21F 15/06
See application file for complete search history.

(56) References Cited

U.S. PATENT DOCUMENTS 5,657,799 A * 8/1997 Kusakari .............. E04G 21/123 140/57
5,694,983 A 12/1997 Kusakari et al.
(Continued)

FOREIGN PATENT DOCUMENTS

CN 1209409 A 3/1999
CN 105386602 A 3/2016
(Continued)

OTHER PUBLICATIONS

English translation of JP-07275983A, 21 pages, retrieved in Feb. 2023. (Year: 1995).*
(Continued)

*Primary Examiner* — Bobby Yeonjin Kim
*Assistant Examiner* — P Derek Pressley
(74) *Attorney, Agent, or Firm* — Banner & Witcoff, Ltd.

(57) ABSTRACT

A reinforcing steel bar binding machine is provided with: a second body part; a cover guide part attached to the second body part; and a first contact member (a second contact member) that is abutted against a reinforcing steel bar and moved. The cover guide part is provided with: a first guide recessed part and a second guide recessed part that movably guide the first contact member; and a first contact part against which the reinforcing steel bar is abutted.

7 Claims, 26 Drawing Sheets

(30) Foreign Application Priority Data

| | | |
|---|---|---|
| Sep. 7, 2018 | (JP) | 2018-168249 |
| Sep. 7, 2018 | (JP) | 2018-168250 |
| Sep. 7, 2018 | (JP) | 2018-168251 |
| Sep. 7, 2018 | (JP) | 2018-168252 |
| Aug. 28, 2019 | (JP) | 2019-156056 |

(56) References Cited

U.S. PATENT DOCUMENTS

| | | | | |
|---|---|---|---|---|
| 5,944,064 | A | 8/1999 | Saito et al. | |
| 6,401,766 | B1 | 6/2002 | Ishikawa et al. | |
| 8,322,006 | B1 * | 12/2012 | Kodi | E04G 21/122 29/243.526 |
| 10,045,776 | B2 | 8/2018 | Shelton, IV et al. | |
| 2005/0061389 | A1 | 3/2005 | Nakagawa et al. | |
| 2006/0157139 | A1 | 7/2006 | Hoyaukin | |
| 2006/0283516 | A1 | 12/2006 | Nagaoka et al. | |
| 2009/0126824 | A1 | 5/2009 | Nakagawa et al. | |
| 2010/0313991 | A1 | 12/2010 | Nagaoka et al. | |
| 2011/0155277 | A1 | 6/2011 | Coles et al. | |
| 2017/0145704 | A1 | 5/2017 | Coles et al. | |
| 2018/0126443 | A1 | 5/2018 | Morijiri et al. | |
| 2018/0155940 | A1 | 6/2018 | Nagaoka et al. | |
| 2018/0187431 | A1 | 7/2018 | Itagaki et al. | |
| 2018/0355627 | A1 | 12/2018 | Morijiri et al. | |
| 2019/0093374 | A1 | 3/2019 | Machida et al. | |
| 2019/0203486 | A1 | 7/2019 | Coles et al. | |
| 2019/0292799 | A1 | 9/2019 | Itagaki et al. | |
| 2020/0385991 | A1 | 12/2020 | Matsuno et al. | |
| 2020/0399914 | A1 | 12/2020 | Nagaoka et al. | |
| 2021/0069772 | A1 | 3/2021 | Morijiri et al. | |
| 2021/0197248 | A1 | 7/2021 | Morijiri et al. | |
| 2021/0237143 | A1 | 8/2021 | Morijiri et al. | |
| 2021/0316428 | A1 | 10/2021 | Morijiri et al. | |
| 2021/0317671 | A1 | 10/2021 | Morijiri et al. | |
| 2021/0339896 | A1 | 11/2021 | Morijiri et al. | |
| 2021/0340781 | A1 | 11/2021 | Morijiri et al. | |
| 2021/0396028 | A1 | 12/2021 | Morijiri et al. | |
| 2022/0282506 | A1 | 9/2022 | Morijiri et al. | |
| 2023/0003039 | A1 | 1/2023 | Nagaoka et al. | |
| 2023/0044936 | A1 | 2/2023 | Morijiri et al. | |
| 2024/0254786 | A1 | 8/2024 | Morijiri et al. | |

FOREIGN PATENT DOCUMENTS

| | | | | | |
|---|---|---|---|---|---|
| CN | 208105894 | U | | 11/2018 | |
| EP | 1475492 | A2 | * | 11/2004 | B65B 13/285 |
| JP | S48-021284 | Y1 | | 6/1973 | |
| JP | S58183862 | U | | 12/1983 | |
| JP | S63191719 | A | | 8/1988 | |
| JP | S63272624 | A | | 11/1988 | |
| JP | H06-156420 | A | | 6/1994 | |
| JP | H106-167115 | A | | 6/1994 | |
| JP | 07275983 | A | * | 10/1995 | E04G 21/123 |
| JP | H07-275982 | A | | 10/1995 | |
| JP | H07-275983 | A | * | 10/1995 | |
| JP | H07-284870 | A | | 10/1995 | |
| JP | H0275983 | A | * | 10/1995 | |
| JP | H07290177 | A | * | 11/1995 | |
| JP | H08-246675 | A | | 9/1996 | |
| JP | 9-13677 | A | | 1/1997 | |
| JP | 2731812 | B2 | | 3/1998 | |
| JP | 2949703 | B2 | | 7/1999 | |
| JP | 3050517 | B2 | * | 6/2000 | E04G 21/122 |
| JP | 2001-140471 | A | | 5/2001 | |
| JP | 2003-147963 | A | | 5/2003 | |
| JP | 2003-175905 | A | | 6/2003 | |
| JP | 2005-194847 | A | | 7/2005 | |
| JP | 2006-520865 | A | | 9/2006 | |
| JP | 2010-112107 | | | 5/2010 | |
| JP | 2011-152606 | A | | 8/2011 | |
| JP | 2017-189822 | A | | 10/2017 | |
| JP | 2017-206923 | A | | 11/2017 | |
| JP | 2018-076106 | A | | 5/2018 | |
| JP | 2018109299 | A | | 7/2018 | |
| JP | 2018204422 | A | | 12/2018 | |
| JP | 2021031150 | A | | 3/2021 | |
| WO | 96/25330 | A1 | | 8/1996 | |
| WO | 2017-014280 | A1 | | 1/2017 | |
| WO | WO-2017199858 | A1 | * | 11/2017 | B21F 15/06 |
| WO | 2018/131218 | A1 | | 7/2018 | |

OTHER PUBLICATIONS

Japanese Office Action dated Jun. 7, 2022, issued by the Japanese Patent Office in the corresponding Japanese Patent Application No. 2018-168247. (7 pages).

Chinese Office Action for Chinese Application No. 201980057794.6 dated May 13, 2022. (7 pp.).

Extended European Search Report dated May 4, 2022, issued by the European Patent Office in the corresponding European Patent Application No. 19857979.9. (8 pages).

International Search Report and Written Opinion dated Nov. 19, 2019 w/English translation in International Application No. PCT/JP2019/035093 (9 pages total).

* cited by examiner

BINDING MACHINE

CROSS REFERENCE TO RELATED APPLICATION

This application is a 35 U.S.C. 371 National Phase Entry Application from PCT/JP2019/035093, filed Sep. 5, 2019, which claims priority to Japanese Patent Application Nos. 2018-168247, filed Sep. 7, 2018, 2018-168248, filed Sep. 7, 2018, 2018-168249, filed Sep. 7, 2018, 2018-168250, filed Sep. 7, 2018, 2018-168251, filed Sep. 7, 2018, 2018-168252, filed Sep. 7, 2018, and 2019-156056, filed Aug. 28, 2019, the disclosures of which are incorporated herein in their entirety by reference, and priority is claimed to each of the foregoing.

TECHNICAL FIELD

The present disclosure relates to a binding machine configured to bind a binding object such as a reinforcing bar and the like with a wire.

BACKGROUND ART

In the related art, suggested is a binding machine referred to as a reinforcing bar binding machine configured to wind a wire fed from a wire feed device into a loop shape around reinforcing bars, and to grip and twist the wire by a twisting hook, thereby tightening and binding the reinforcing bars with the wire (for example, refer to PTL 1).

The reinforcing bar binding machine disclosed in PTL 1 has a configuration where a contact member that is engaged to the reinforcing bars during binding is provided to be movable in a front and back direction and a switch that is engaged when the contact member is moved backward and enables actuation of the binding machine is provided.

PTL 1: JP 2949703 B

SUMMARY OF INVENTION

In the reinforcing bar binding machine disclosed in PTL 1, if a moving amount of the contact member cannot be secured, even when the contact member is moved backward, it cannot engage with the switch, so that the binding operation cannot be executed. However, PTL 1 does not consider a configuration of securing the moving amount of the contact member.

In response to the above issue, it is an object of the present disclosure to provide a binding machine capable of securing a moving amount of a movable part (contact member) configured to be butted against a binding object and to be thus moved.

A binding machine according to one aspect of the present disclosure includes a body part, a cover guide part attached to the body part, and a movable part to be butted against a binding object and to be thus moved, wherein the cover guide part includes a guide part configured to movably guide the movable part and a contact part against which the binding object is to be butted.

When the movable part butted against the binding object is moved to a predetermined position, an operation of binding the binding object is executed.

In the binding machine according to the one aspect of the present disclosure, a moving amount of the movable part is defined by the cover guide part having the contact part. Therefore, the moving amount of the movable part that is butted against the binding object and thus moved can be set to a predefined range until the binding object reaches a position at which the binding object is butted against the contact part.

DESCRIPTION OF EMBODIMENTS

Hereinbelow, examples of the reinforcing bar binding machine as embodiments of the binding machine of the present invention will be described with reference to the drawings.

<Example of Reinforcing Bar Binding Machine of First Embodiment>

Figure 1A:
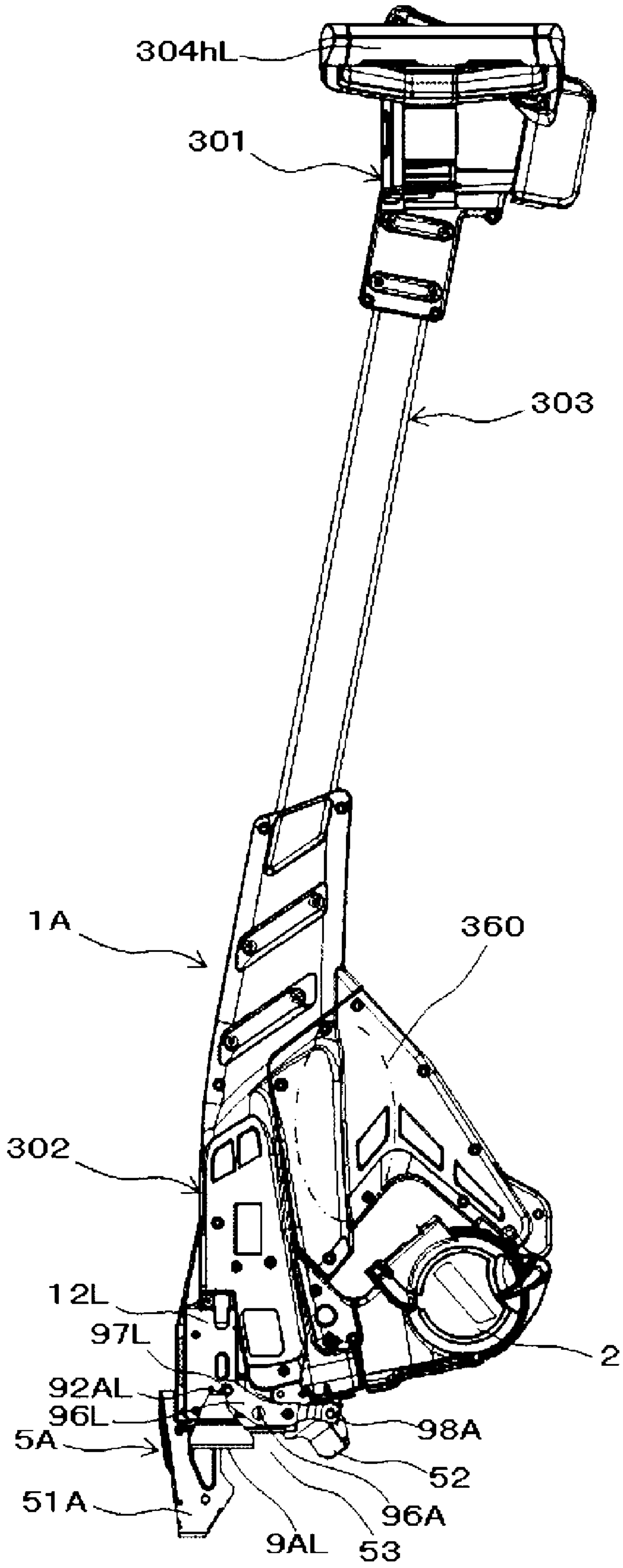
FIG. 1A is a side view depicting an example of an overall configuration of a reinforcing bar binding machine of a first embodiment.
Figure 1B:
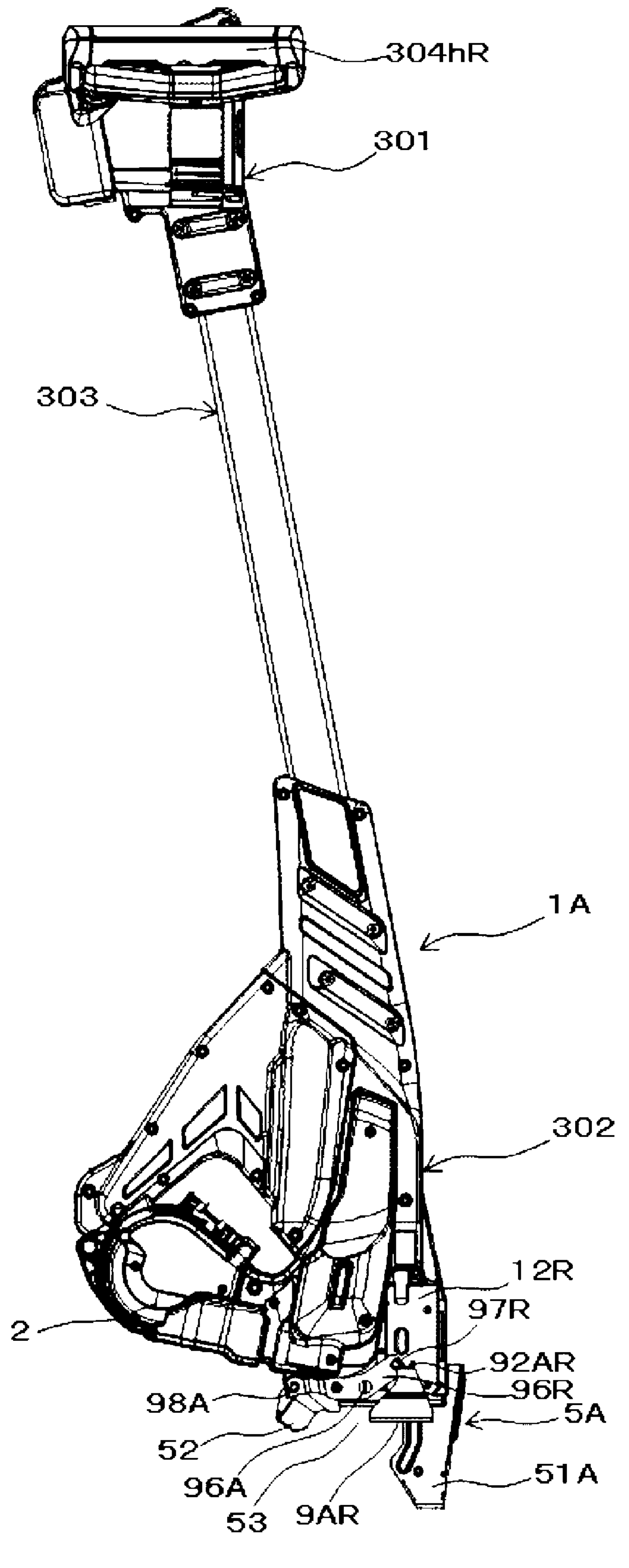
FIG. 1B is a side view depicting the example of the overall configuration of the reinforcing bar binding machine of the first embodiment.
Figure 1C:
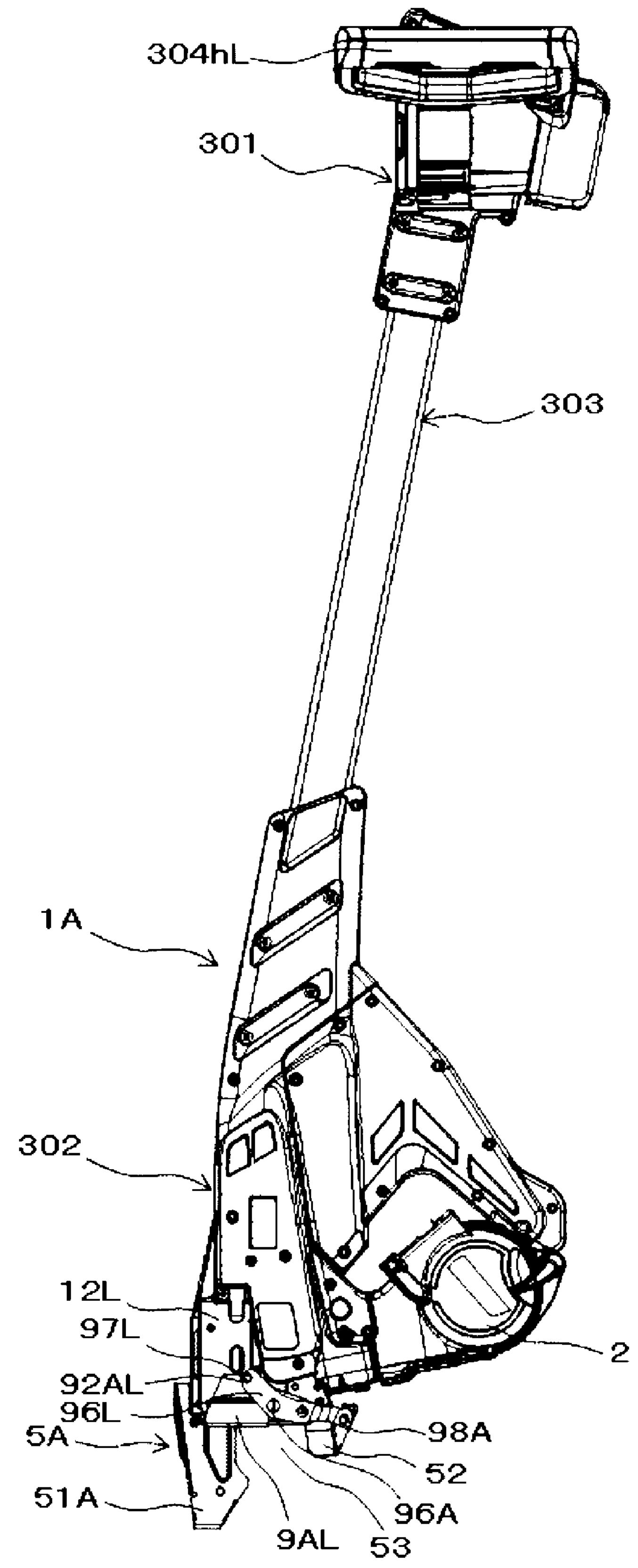
FIG. 1C is a side view depicting the example of the overall configuration of the reinforcing bar binding machine of the first embodiment.
Figure 1D:
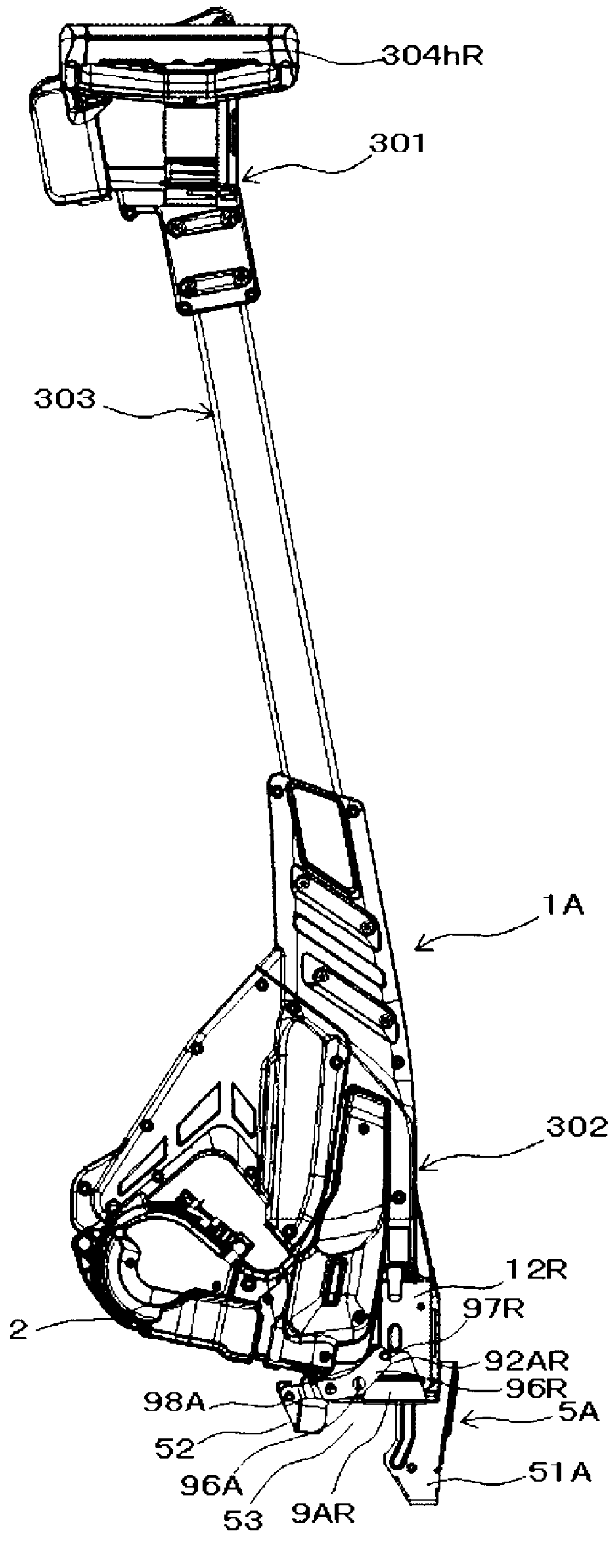
FIG. 1D is a side view depicting the example of the overall configuration of the reinforcing bar binding machine of the first embodiment.
Figure 2:
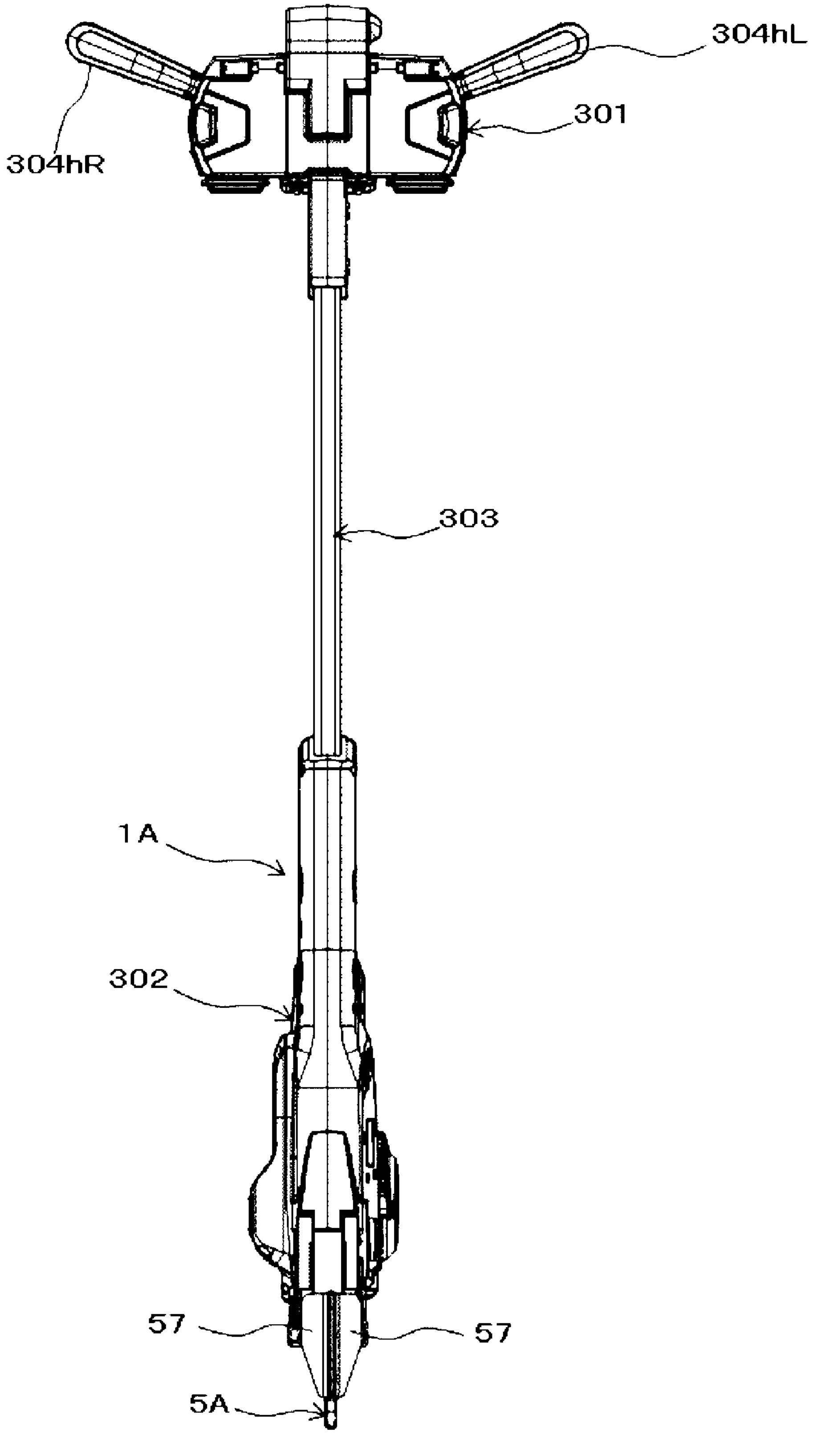
FIG. 2 is a top view depicting the example of the overall configuration of the reinforcing bar binding machine of the first embodiment.
Figure 3A:
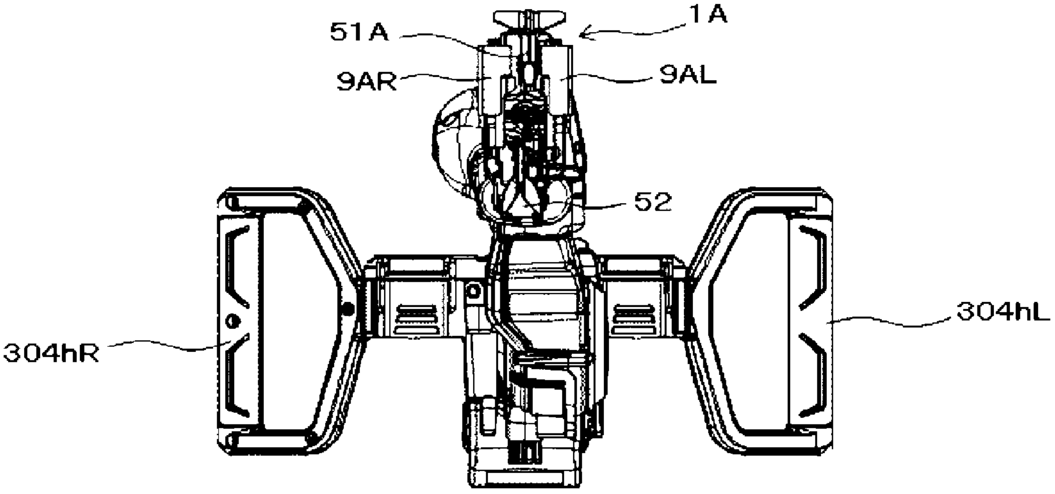
FIG. 3A is a front view depicting the example of the overall configuration of the reinforcing bar binding machine of the first embodiment.
Figure 3B:
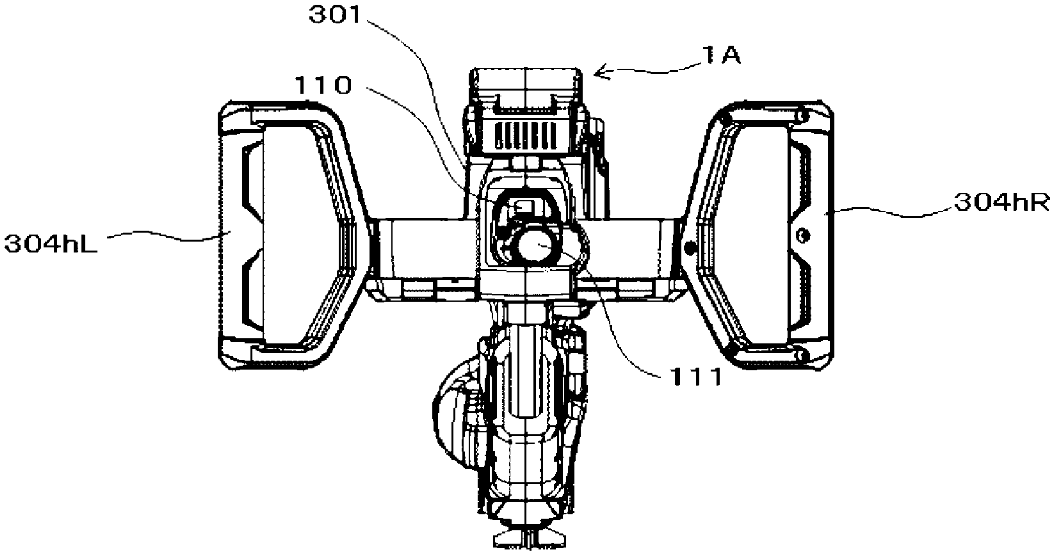
FIG. 3B is a rear view depicting the example of the overall configuration of the reinforcing bar binding machine of the first embodiment.
Figure 4:
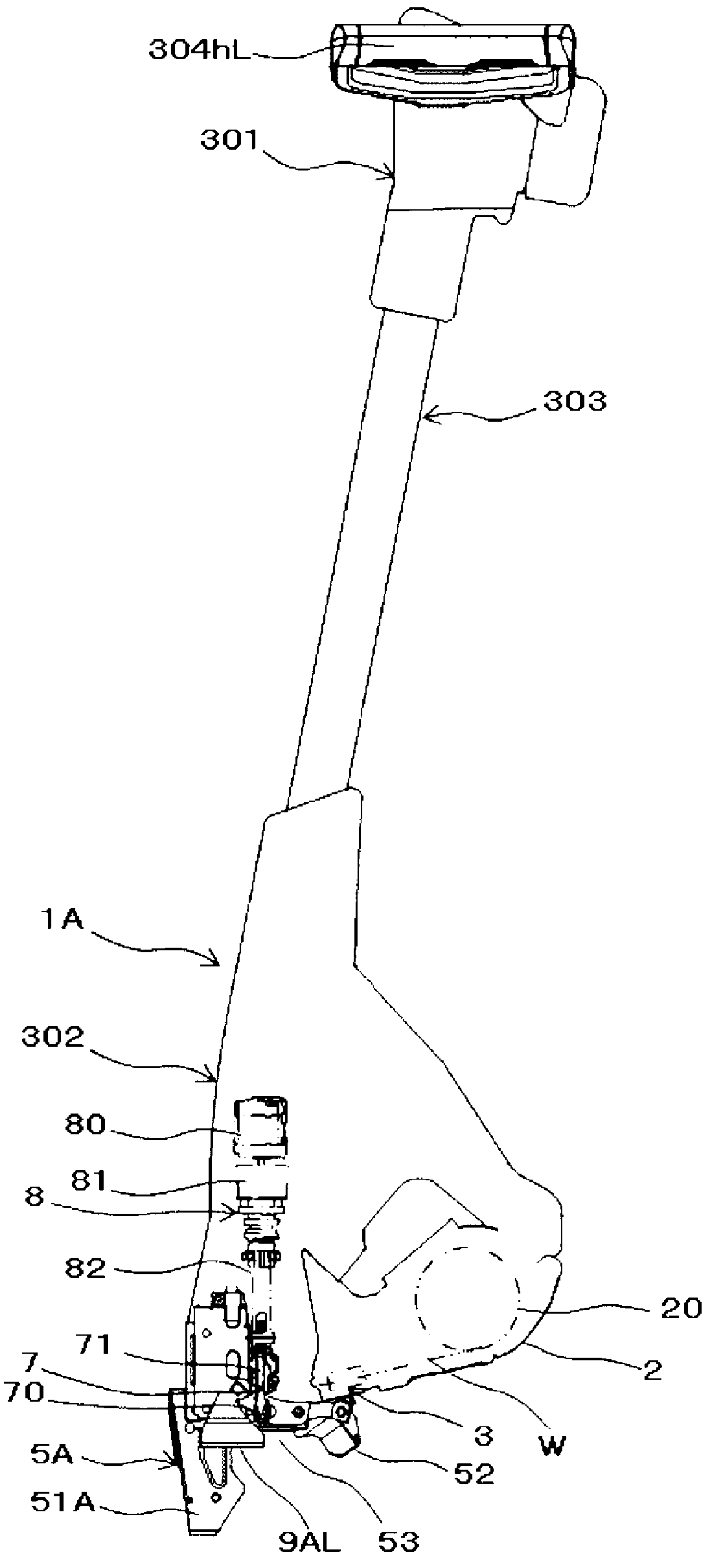
FIG. 4 is a side view depicting an example of an internal configuration of the reinforcing bar binding machine of the first embodiment.
Figure 5A:
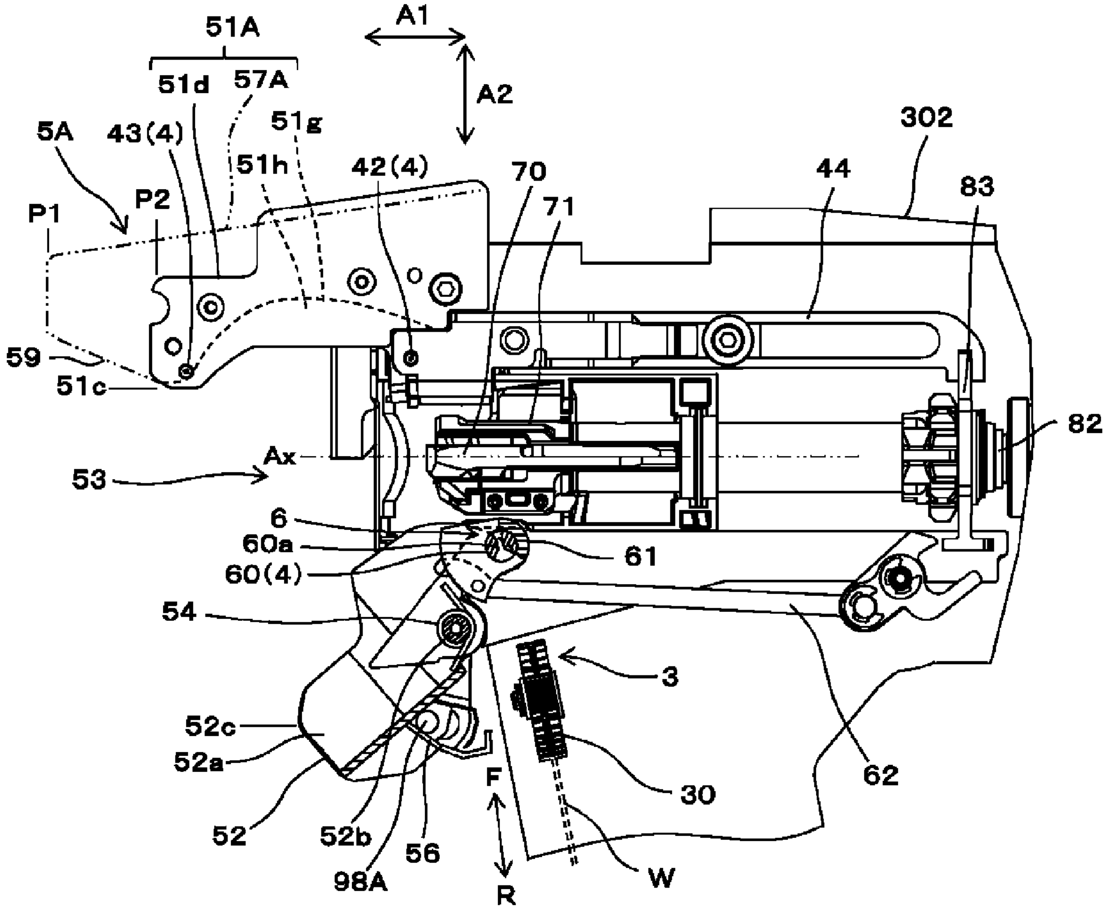
FIG. 5A is a side view depicting main parts of the internal configuration of the reinforcing bar binding machine of the first embodiment.
Figure 5B:
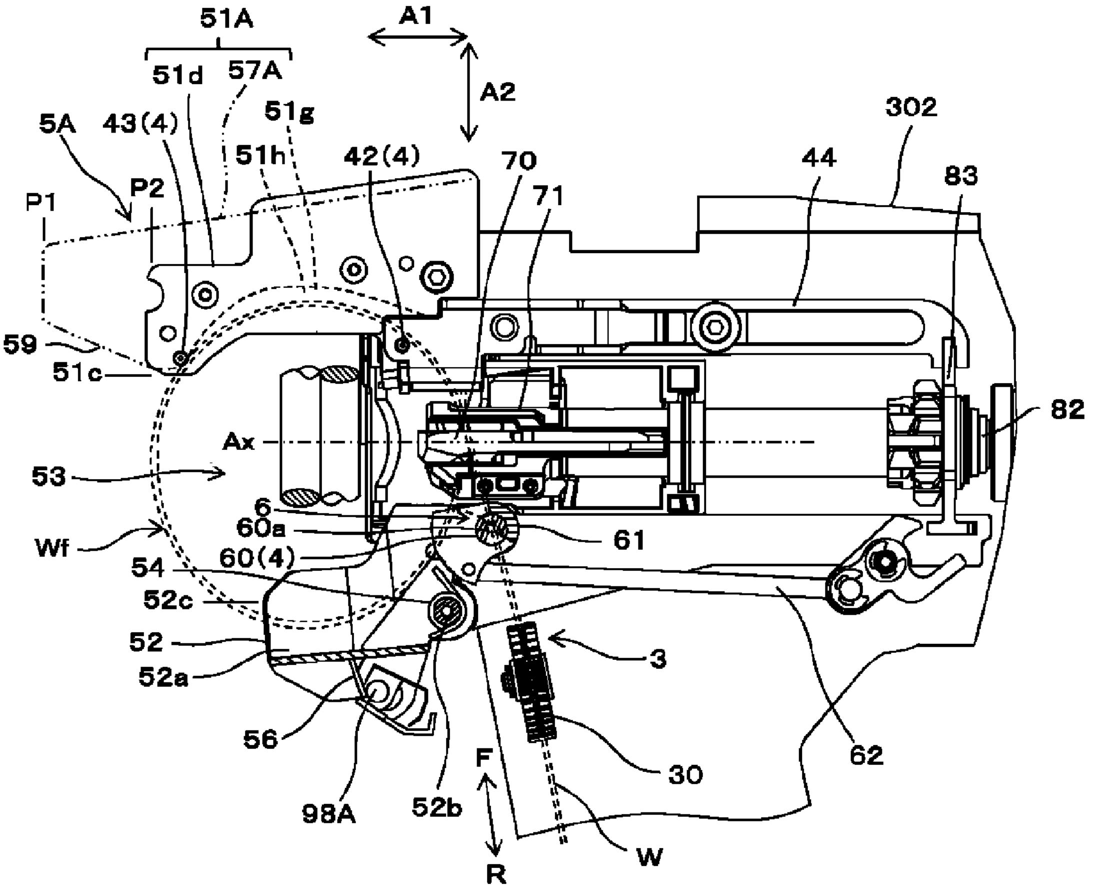
FIG. 5B is a side view depicting the main parts of the internal configuration of the reinforcing bar binding machine of the first embodiment.

FIGS. 1A, 1B, 1C and 1D are side views depicting an example of an overall configuration of a reinforcing bar binding machine of a first embodiment, FIG. 2 is a top view depicting the example of the overall configuration of the reinforcing bar binding machine of the first embodiment, FIG. 3A is a front view depicting the example of the overall configuration of the reinforcing bar binding machine of the first embodiment, and FIG. 3B is a rear view depicting the example of the overall configuration of the reinforcing bar binding machine of the first embodiment. FIG. 4 is a side view depicting an example of an internal configuration of the reinforcing bar binding machine of the first embodiment, and FIGS. 5A and 5B are side views depicting main parts of the internal configuration of the reinforcing bar binding machine of the first embodiment.

A reinforcing bar binding machine 1A of the first embodiment includes a first body part 301 configured to be held by a hand, a second body part 302 having a mechanism for binding reinforcing bars S with a wire W, and an elongated connecting part 303 configured to connect the first body part 301 and the second body part 302 each other. The first body part 301 has a pair of handle parts 304*h*L and 304 hR that can be gripped by an operator. The first body part 301 also has a power supply switch 110 with which operations of cutting off and turning on a power supply of the reinforcing bar binding machine 1A are performed, and an operation unit 111 having a dial capable of adjusting a binding force.

The second body part 302 is an example of the body part, and an outer covering thereof is made of resin. The second body part 302 has an accommodation part 2 configured to rotatably accommodate a wire reel 20 on which the wire W is wound, and a feeding unit 3 configured to feed the wire W wound on the wire reel 20 accommodated in the accommodation part 2. The second body part 302 also has a regulation part 4 configured to curl the wire W fed by the feeding unit 3, and a guide or guide part 5A configured to guide the wire W curled by the regulation part 4. The second body part 302 also has a cutting unit 6 configured to cut the wire W, a twisting unit 7 configured to twist the wire W, and a drive unit 8 configured to drive the cutting unit 6, the twisting unit 7, and the like.

In the reinforcing bar binding machine 1A, the guide or guide part 5A is provided on one side of the second body part 302. In the reinforcing bar binding machine 1A, the first body part 301 and the second body part 302 are connected by the connecting part 303, so that the guide part 5A and the handle parts 304*h*L and 304*h*R are extended therebetween, as compared to a reinforcing bar binding machine with no connecting part 303. In the present embodiment, the side on which the guide or guide part 5A is provided is defined as the front.

The accommodation part 2 is configured so that the wire reel 20 can be attached/detached and supported. The feeding unit 3 has a pair of feeding gears 30 as a feeding member. When a motor (not shown) rotates the feeding gears 30 in a state where the wire W is sandwiched between the pair of feeding gears 30, the feeding unit 3 feeds the wire W. The feeding unit 3 can feed the wire W in a forward direction denoted with an arrow F and in a reverse direction denoted with an arrow R, according to a rotating direction of the feeding gears 30.

The cutting unit 6 is provided downstream of the feeding unit 3 with respect to the feeding of the wire W in the forward direction denoted with the arrow F. The cutting unit 6 has a fixed blade part 60, and a movable blade part 61 configured to cut the wire W in cooperation with the fixed blade part 60. The cutting unit 6 also has a transmission mechanism 62 configured to transmit motion of the drive unit 8 to the movable blade part 61.

The fixed blade part 60 has an opening 60*a* through which the wire W passes. The movable blade part 61 is configured to cut the wire W passing through the opening 60*a* of the fixed blade part 60 by a rotating operation about the fixed blade part 60 as a support point.

The regulation part 4 has a first regulation member to a third regulation member in contact with the wire W at a plurality of parts, in the present example, at least three places in a feeding direction of the wire W fed by the feeding unit 3, thereby curling the wire W along a feeding path Wf of the wire W shown with the broken line in FIG. 5B.

The first regulation member of the regulation part 4 is constituted by the fixed blade part 60. The regulation part 4 also has a regulation member 42 as the second regulation member provided downstream of the fixed blade part 60 with respect to the feeding of the wire W in the forward direction denoted with the arrow F, and a regulation member 43 as the third regulation member provided downstream of the regulation member 42. The regulation member 42 and the regulation member 43 are each constituted by a cylindrical member, and the wire W is in contact with outer peripheral surfaces thereof.

In the regulation part 4, the fixed blade part 60, the regulation member 42 and the regulation member 43 are arranged on a curve in conformity to the feeding path Wf of the wire W, which has a substantially annular shape drawing a spiral. The opening 60*a* of the fixed blade part 60 through which the wire W passes is provided on the feeding path Wf of the wire W. The regulation member 42 is provided on a diametrically inner side with respect to the feeding path Wf of the wire W. The regulation member 43 is provided on a diametrically outer side with respect to the feeding path Wf of the wire W.

Thereby, the wire W fed by the feeding unit 3 passes in contact with the fixed blade part 60, the regulation member 42 and the regulation member 43, so that the wire W is curled to follow the feeding path Wf of the wire W.

The regulation part 4 has the transmission mechanism 44 configured to transmit motion of the drive unit 8 to the regulation member 42. In operations of feeding the wire W in the forward direction by the feeding unit 3 and curling the wire W, the regulation member 42 is configured to move to a position at which it contacts the wire W, and in operations of feeding the wire W in the reverse direction and winding the wire W on the reinforcing bars S, the regulation member 42 is configured to move to a position at which it does not contact the wire W.

The guide part 5A has a first guide 51A configured to guide the wire W, a second guide 52 configured to guide the wire W curled by the regulation part 4 and the first guide 51A to the twisting unit 7, and a third guide 55 configured to regulate a diametrical position with respect to the feeding path Wf of the wire W.

The first guide 51A is attached to an end portion on a front side of the second body part 302, and extends in a first direction that is a front and back direction denoted with the arrow A1. As shown in FIGS. 5A and 5B, the first guide 51A has a groove portion 51*h* having a guide surface 51*g* with which the wire W fed by the feeding unit 3 is in sliding contact.

As for the first guide 51A, when a side attached to the second body part 302 is referred to as a base end-side and a side extending in the first direction from the second body part 302 is referred to as a tip end-side, the base end-side is attached to the second body part 302 by a screw and the like.

In the first guide 51A, the regulation member 42 is provided on the base end-side, and the regulation member 43 is provided on the tip end-side. The first guide 51A has a gap, through which the wire W can pass, formed between the guide surface 51*g* and the outer peripheral surface of the regulation member 42. In the first guide 51A, a part of the outer peripheral surface of the regulation member 43 protrudes to the guide surface 51*g*.

The second guide 52 is attached to an end portion on the front side of the second body part 302. The second guide 52 is provided facing the first guide 51A in a second direction that is an upper and lower direction orthogonal to the first direction and denoted with an arrow A2. The first guide 51A and the second guide 52 are spaced by a predetermined interval in the second direction, and an insertion/pulling-out opening 53 in and from which the reinforcing bars S are inserted/pulled out is formed between the first guide 51A and the second guide 52.

The second guide 52 has a pair of side guides 52*a* facing in a third direction that is a right and left direction orthogonal to the first direction and the second direction and denoted with an arrow A3. As for the second guide 52, when a side attached to the second body part 302 is referred to as a base end-side and a side extending in the first direction from the second body part 302 is referred to as a tip end-side, a gap between the pair of side guides 52*a* gradually decreases from the tip end-side toward the base end-side. In the pair of side guides 52*a*, the base end-sides face each other with a gap through which the wire W can pass.

The second guide 52 is supported on the base end-side to a shaft 52*b* via the third guide 55 attached to the second body part 302 by a screw and the like, and is attached to the second body part 302. An axis line of the shaft 52*b* faces toward the third direction. The second guide 52 can rotate about the shaft 52*b* as a support point with respect to the second body part 302. The second guide 52 can move in directions in which an end portion 52*c* on the tip end-side comes close to and separates from an end portion 51*c* of the first guide 51A facing the second guide 52 in the second direction denoted with the arrow A2. An end portion P2 of the groove portion 51*h* is exposed to the end portion 51*c* of the first guide 51A.

The second guide 52 is configured to rotate about the shaft 52*b* as a support point in conjunction with a pair of contact members (which will be described later), thereby moving between a first position (FIG. 5A) at which a distance between the end portion 52*c* on the tip end-side of the second guide 52 and the end portion 51*c* of the first guide 51A is a first distance and a second position (FIG. 5B) at which the distance between the end portion 52*c* of the second guide 52 and the end portion 51*c* of the first guide 51A is a second distance shorter than the first distance.

In a state where the second guide 52 is located at the second position, the end portion 52*c* of the second guide 52 and the end portion 51*c* of the first guide 51A are opened therebetween. In a state where the second guide 52 is located at the first position, the interval between the end portion 52*c* of the second guide 52 and the end portion 51*c* of the first guide 51A is larger, so that the reinforcing bars can be more easily inserted into the insertion/pulling-out opening 53 between the first guide 51A and the second guide 52.

In the state where the second guide 52 is located at the second position, the side guide 52*a* is positioned on the feeding path Wf of the wire W shown in FIG. 5B. In the state where the second guide 52 is located at the first position, as long as the interval between the end portion 52*c* of the second guide 52 and the end portion 51*c* of the first guide 51A is greater than the case where the second guide 52 is located at the second position, the side guide 52*a* may be positioned on the feeding path Wf of the wire W or the side guide 52*a* may be positioned on an outermore side than the feeding path Wf of the wire W.

The second guide 52 is urged in a moving direction to the first position by an urging member 54 such as a tortional coil spring and is held at the first position.

The second guide 52 has a receiving part 56 configured to receive an operation of the pair of contact members (which will be described later) via a link part. The receiving part 56 is constituted by a surface vertical to a lower surface of the second guide 52 or a surface inclined relative to a direction vertical to the lower surface of the second guide 52. The receiving part 56 is constituted by providing the lower surface of the second guide 52 with a surface protruding in a rotating direction of the second guide 52 about the shaft 52*b* as a support point, for example. The receiving part 56 is inclined so that a distance from the shaft 52*b* to a surface of the receiving part 56 increases toward the second guide 52 in a direction parallel to the lower surface of the second guide 52, for example.

The guide part 5A has an induction part 59 configured to guide the reinforcing bars S to the insertion/pulling-out opening 53. The induction part 59 is provided on the tip end-side of the first guide 51A, and is provided with a surface along which an interval between the first guide 51A and the second guide 52 decreases from a tip end-side toward a base end-side of the induction part 59. Specifically, the induction part 59 is constituted by an inclined surface inclined relative to the first direction denoted with the arrow A1 in a direction in which the interval between the first guide 51A and the second guide 52 decreases, from a tip end P1 of the first guide 51A toward a vicinity of an end portion P2 of the groove portion 51*h* on the tip end-side of the first guide 51A.

The guide part 5A has protrusions 57 provided to the first guide 51A. The protrusions 57 are constituted by providing portions protruding laterally from the first guide 51A in the third direction denoted with the arrow A3. In the present example, the first guide 51A has the groove portion 51*h* having the guide surface 51*g* and the regulation member 43, and a guide arm 51*d* configured to guide the wire W is covered by a cover part 57A made of a metal plate. The protrusions 57 are constituted by bending each of an upper end portion of the cover part 57A covering one side part of the guide arm 51*d* and an upper end portion of the cover part 57A covering the other side part toward outer sides in the third direction. Note that, the protrusions 57 may be provided to the guide arm 51*d*. The first guide 51A may have a configuration where the guide arm 51*d* and the cover part 57A are integrated, and the protrusions 57 may be provided integrally with the first guide 51A having the configuration where the guide arm 51*d* and the cover part 57A are integrated. The protrusions 57 may also be constituted by providing an uneven shape to a side part of the cover part 57A, a side part of the guide arm 51*d*, and a side part of the first guide 51A having the configuration where the guide arm 51*d* and the cover part 57A are integrated.

The twisting unit 7 includes an engaging part 70 to which the wire W is engaged, and an actuation part 71 configured to actuate the engaging part 70. The engaging part 70 is formed with a first passage through which the wire W fed to the cutting unit 6 by the feeding unit 3 passes, and a second passage through which the wire W curled by the regulation part 4 and guided to the twisting unit 7 by the guide part 5A passes. The engaging part 70 is configured to rotate by an operation of the actuation part 71, thereby twisting the wire W wound on the reinforcing bars S.

The drive unit 8 includes a twisting motor 80 configured to drive the twisting unit 7 and the like, a decelerator 81 configured to perform deceleration and torque amplification, a rotary shaft 72 configured to drive and rotate via the decelerator 81 by the twisting motor 80, and a movable member 83 configured to transmit a drive force to the cutting unit 6 and the regulation member 42. The twisting unit 7 and the drive unit 8 are arranged so that centers of rotation of the rotary shaft 82 and the actuation part 71 and engaging part 70 are on the same axis. The centers of rotation of the rotary shaft 82 and the actuation part 71 and engaging part 70 are referred to as an axis line Ax. In the present example, the first direction denoted with the arrow A1 is a direction along the axis line Ax.

The drive unit 8 is configured to move the actuation part 71 along an axis direction of the rotary shaft 82 by a rotating operation of the rotary shaft 82. The actuation part 71 is moved along the axis direction of the rotary shaft 82, so that the engaging part 70 holds a tip end-side of the wire W guided to the twisting unit 7 by the guide part 5A.

In the drive unit 8, the movable member 83 is configured to move along the axis direction of the rotary shaft 82 in conjunction with the moving operation of the actuation part 71 along the axis direction of the rotary shaft 82, so that the motion of the movable member 83 is transmitted to the regulation member 42 by the transmission mechanism 44 and the regulation member 42 is thus moved to a position at which it does not contact the wire. In addition, the actuation part 71 is configured to move along the axis direction of the rotary shaft 82, so that the motion of the movable member 83 is transmitted to the movable blade part 61 by the transmission mechanism 62 and the movable blade part 61 is thus actuated to cut the wire W.

The drive unit 8 is configured to rotate the actuation part 71 moved along the axis direction of the rotary shaft 82 by the rotating operation of the rotary shaft 82. The actuation part 71 is configured to rotate about the axis of the rotary shaft 82, thereby twisting the wire W by the engaging part 70.

Figure 6A:
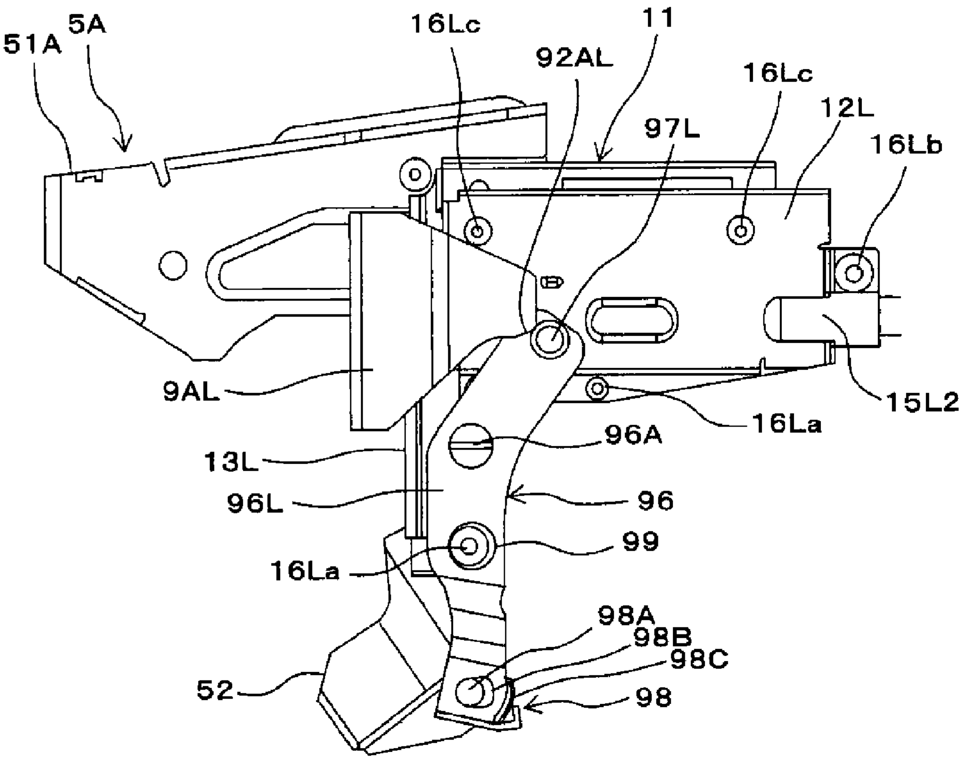
FIG. 6A is a side view depicting a configuration of main parts of the reinforcing bar binding machine of the first embodiment.
Figure 6B:
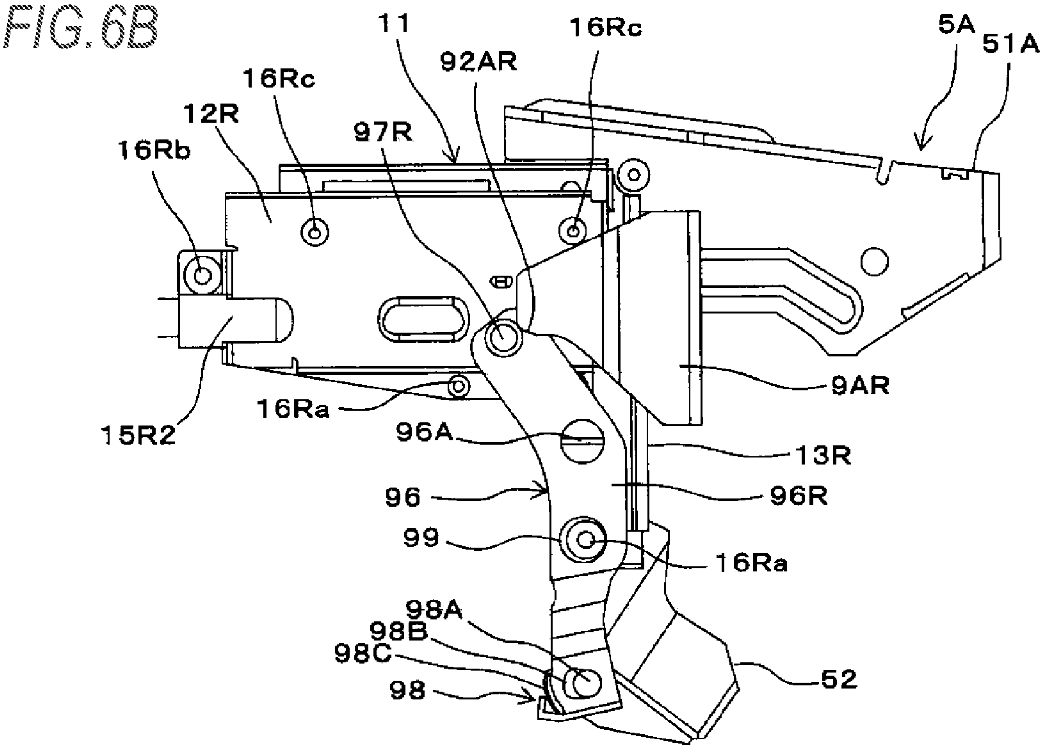
FIG. 6B is a side view depicting the configuration of the main parts of the reinforcing bar binding machine of the first embodiment.
Figure 7:
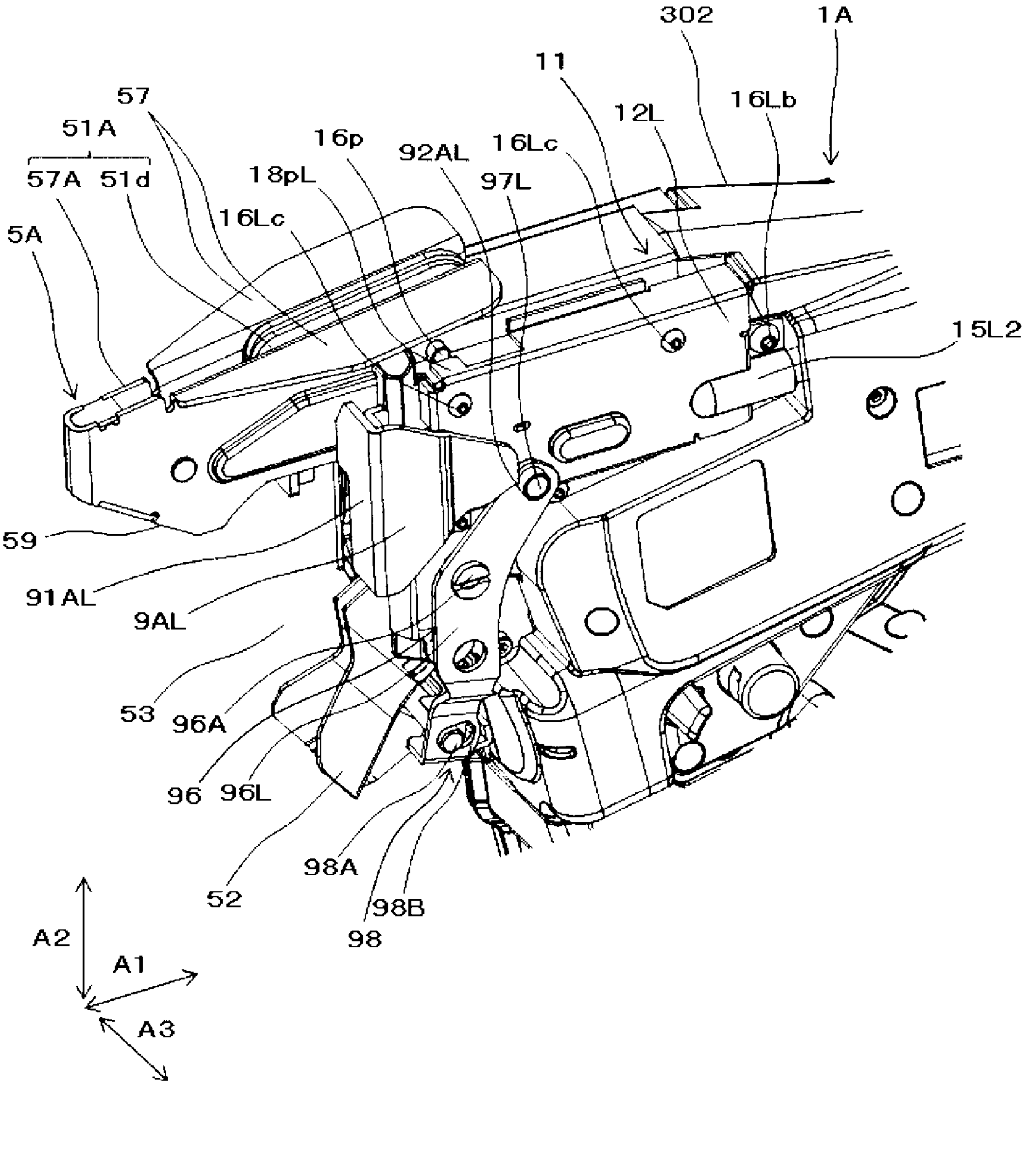
FIG. 7 is a perspective view depicting the configuration of the main parts of the reinforcing bar binding machine of the first embodiment.
Figure 8:
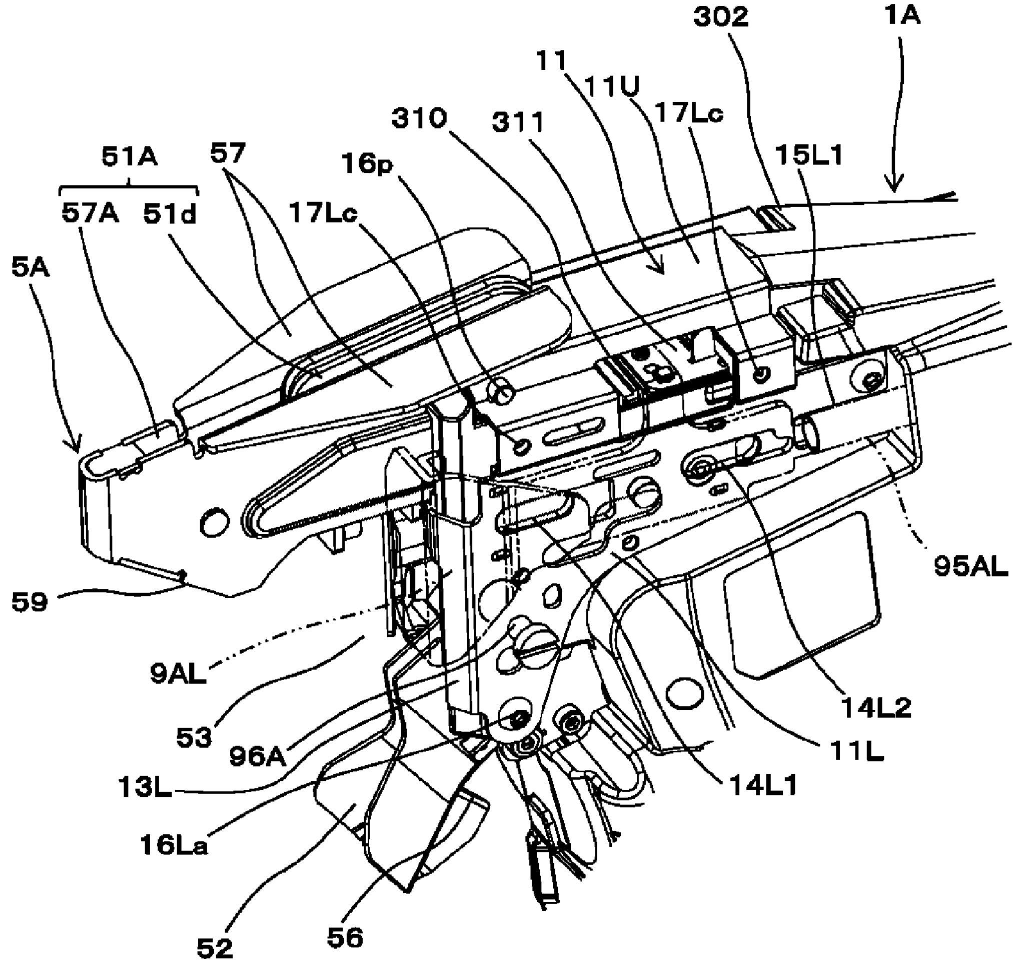
FIG. 8 illustrates the configuration of the main parts and an operational effect of the reinforcing bar binding machine of the first embodiment.

FIGS. 6A and 6B are side views depicting a configuration of main parts of the reinforcing bar binding machine of the first embodiment, and FIG. 7 is a perspective view depicting the configuration of main parts of the reinforcing bar binding machine of the first embodiment. In the below, configurations of the contact member and the link part configured to cause the contact member to move in conjunction with the second guide are described.

The reinforcing bar binding machine 1A includes a first contact member 9AL and a second contact member 9AR to which the reinforcing bars S, which are a binding object inserted in the insertion/pulling-out opening 53 between the first guide 51A and the second guide 52, are contacted. The reinforcing bar binding machine 1A also includes the link part 96 configured to transmit motions of the first contact member 9AL and the second contact member 9AR to the second guide 52.

The first contact member 9AL is an example of the movable part, is provided to one side part of the second body part 302, and has a contact part 91AL to be butted against the reinforcing bars S and an acting part 92AL configured to actuate the link part 96. The second contact member 9AR is an example of the movable part, is provided to the other side part of the second body part 302, and has a contact part 91AR to be butted against the reinforcing bars S and an acting part 92AR configured to actuate the link part 96.

The first contact member 9AL is provided to be movable along the first direction denoted with the arrow A1, and is configured to move between a standby position at which the contact part 91AL protrudes into the insertion/pulling-out opening 53, as shown in FIG. 1A, and an actuation position at which the second guide 52 is caused to move to the second position, as shown in FIG. 1C.

The second contact member 9AR is provided to be movable along the first direction denoted with the arrow A1, and is configured to move between the standby position at which the contact part 91AR protrudes into the insertion/pulling-out opening 53, as shown in FIG. 1B, and an actuation position at which the second guide 52 is caused to move to the second position, as shown in FIG. 1D.

The link part 96 is an example of the guide moving part, and has a first link member 96L corresponding to the first contact member 9AL and a second link member 96R corresponding to the second contact member 9AR. The first link member 96L and the second link member 96R of the link part 96 are rotatably supported by a shaft 96A that is a motion support point.

The link part 96 has an acted part 97L provided on one side of the first link member 96L with respect to the shaft 96A and connected to the first contact member 9AL. The acted part 97L is constituted by a member protruding laterally from the first link member 96L, and is in contact with the acting part 92AL of the first contact member 9AL.

The link part 96 also has an acted part 97R provided on one side of the second link member 96R with respect to the shaft 96A and connected to the second contact member 9AR. The acted part 97R is constituted by a member protruding laterally from the second link member 96R, and is in contact with the acting part 92AR of the second contact member 9AR.

The link part 96 also has a connecting part 98 provided on the other side with respect to the shaft 96A and configured to connect the first link member 96L and the second link member 96R each other. The connecting part 98 has an acting shaft 98A in contact with the receiving part 56 of the second guide 52, an opening portion 98B for supporting the acting shaft 98A, and a spring 98C for pressing the acting shaft 98A.

The acting shaft 98A is formed to have a cylindrical shape, and has a length connecting the first link member 96L and the second link member 96R each other.

The opening portion 98B is provided to each of the first link member 96L and the second link member 96R. The opening portion 98B is configured so that a circumferential length along a rotating direction of the link part 96 about the shaft 96A as a support point and an orthogonal length in a diametrical direction are larger than a diameter of the acting shaft 98A. Thereby, the acting shaft 98A inserted in the opening portion 98B can move in the circumferential direction along the rotating direction of the link part 96 about the shaft 96A as a support point or a tangential direction and in the diametrical direction orthogonal to the rotation direction.

The spring 98C is constituted by a plate spring, and urges the acting shaft 98A toward the receiving part 56 of the second guide 52.

FIGS. 8 to 15A and 15B illustrate the configuration of the main parts and operational effects of the reinforcing bar binding machine of the first embodiment. In the below, a configuration of attaching the contact member and the link part is described in detail.

The reinforcing bar binding machine 1A includes a cover guide part 11 configured to cover a predetermined front part of the second body part 302. The first contact member 9AL, the second contact member 9AR and the link part 96 are attached to the cover guide part 11. The reinforcing bar binding machine 1A also includes a first cover part 12L and a second cover part 12R attached to the cover guide part 11.

The cover guide part 11 has a first sidewall part 11L attached to one side part 302L of the second body part 302, a second sidewall part 11R attached to the other side part 302R of the second body part 302, and a connection part 11U configured to connect the first sidewall part 11L and the second sidewall part 11R.

Figure 11:
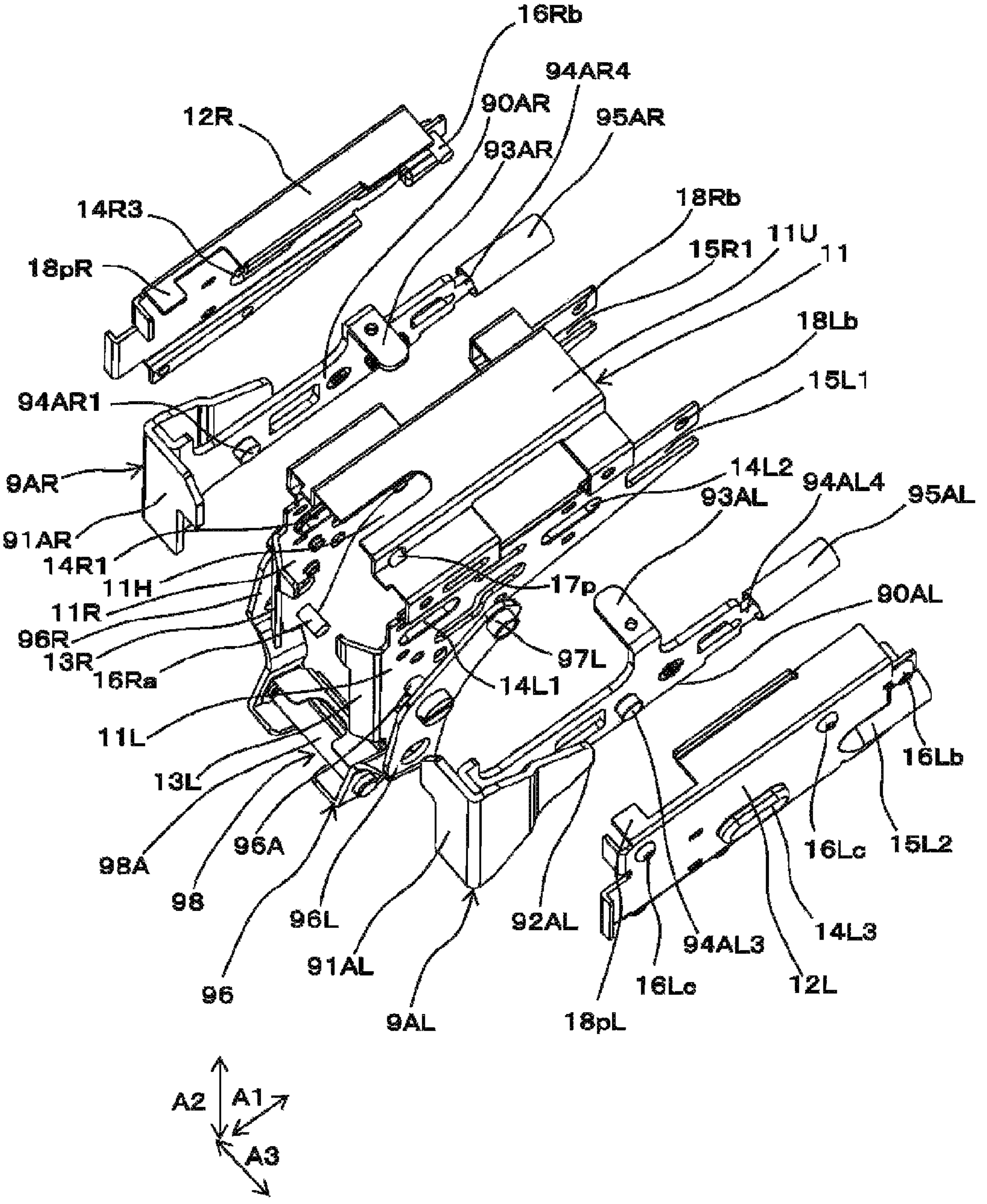
FIG. 11 illustrates the configuration of the main parts and an operational effect of the reinforcing bar binding machine of the first embodiment.

As shown in FIG. 11, the first sidewall part 11L, the second sidewall part 11R and the connection part 11U of the cover guide part 11 are integrally constituted by a metal plate. The first sidewall part 11L and the second sidewall part 11R of the cover guide part 11 face each other with an interval equivalent to a size of the second body part 302 in a width direction along the third direction denoted with the arrow A3.

Figure 13:
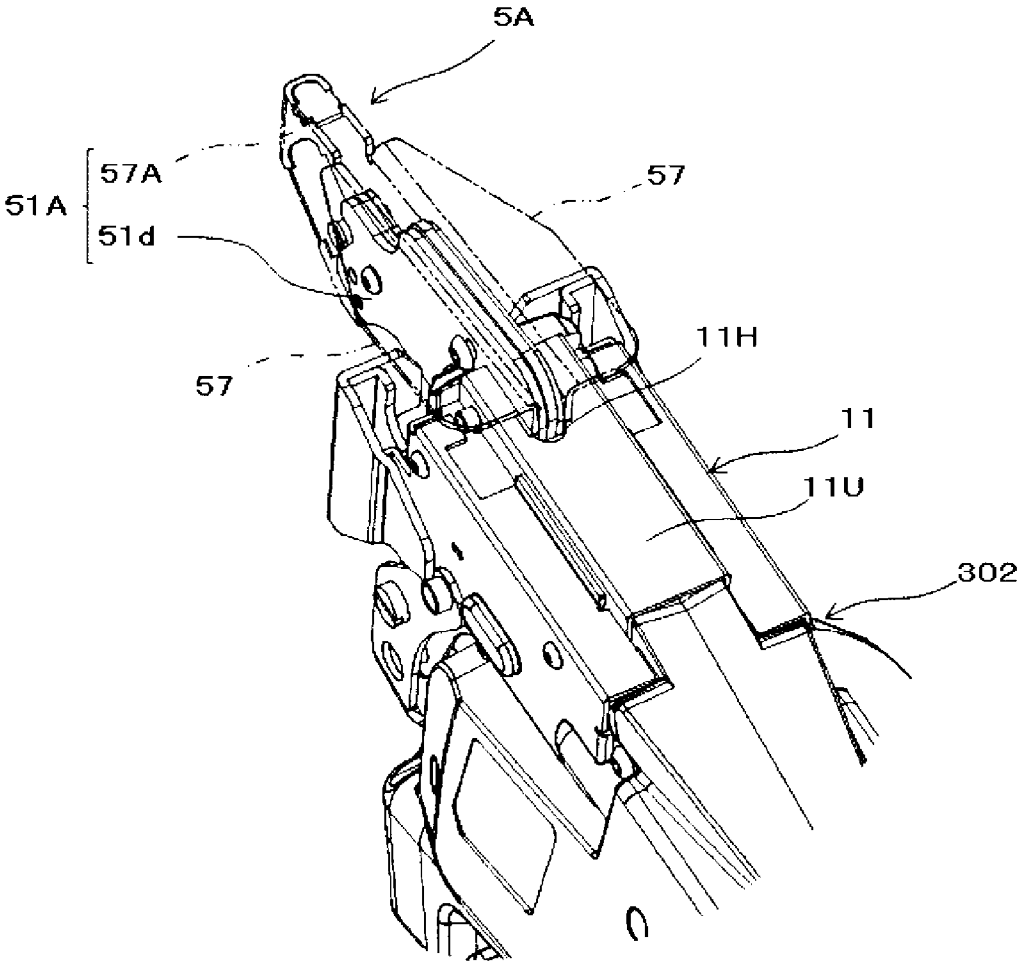
FIG. 13 illustrates the configuration of the main parts and an operational effect of the reinforcing bar binding machine of the first embodiment.
Figure 14:
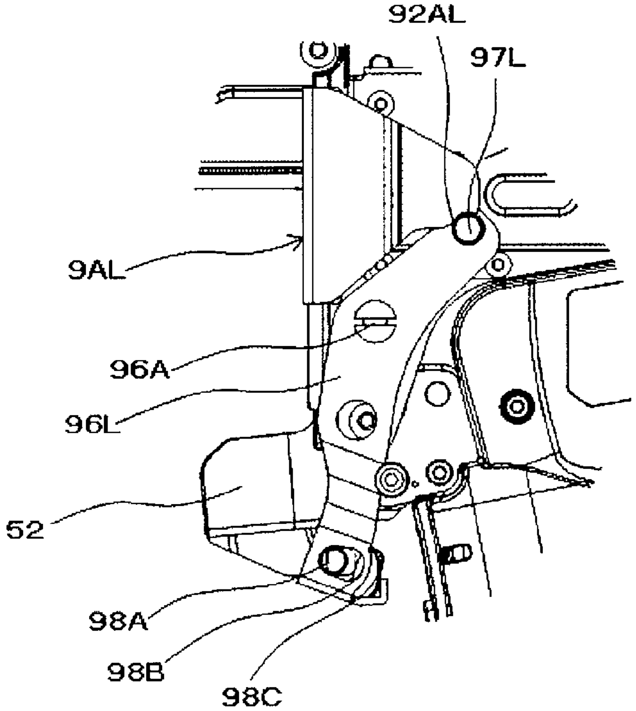
FIG. 14 illustrates the configuration of the main parts and an operational effect of the reinforcing bar binding machine of the first embodiment.
Figure 15A:
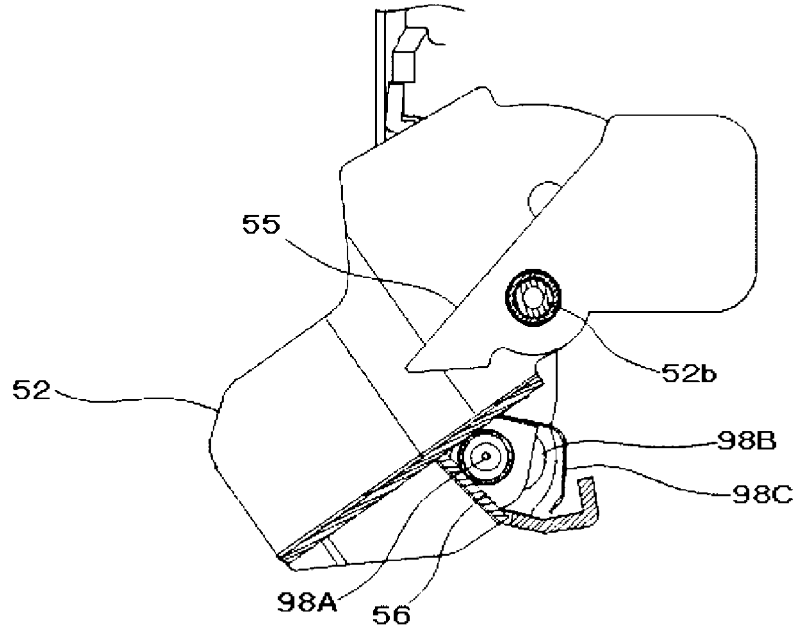
FIG. 15A illustrates the configuration of the main parts and an operational effect of the reinforcing bar binding machine of the first embodiment.
Figure 15B:
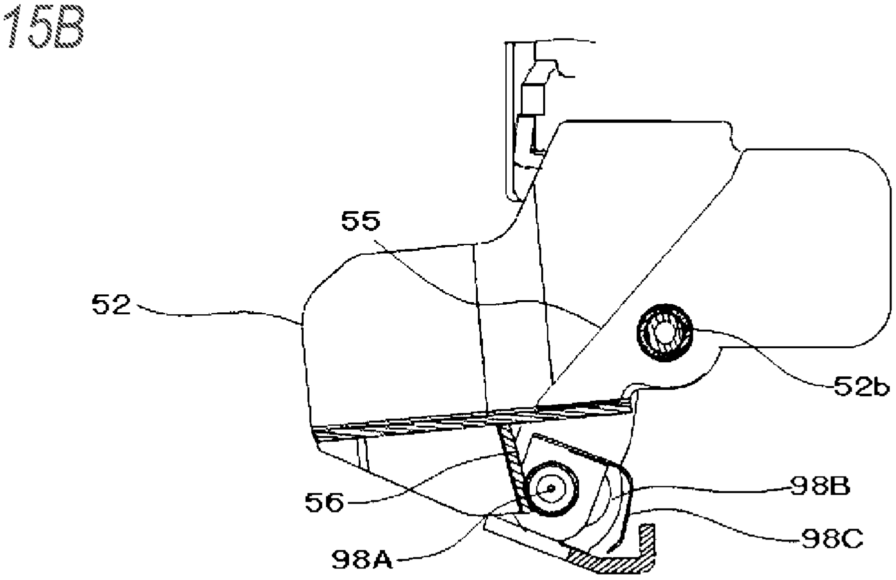
FIG. 15B illustrates the configuration of the main parts and an operational effect of the reinforcing bar binding machine of the first embodiment.

The first sidewall part 11L extends in the second direction denoted with the arrow A2 from one side part of the connection part 11U so as to follow one side part 302L of the second body part 302. The second sidewall part 11R extends in the second direction denoted with the arrow A2 from the other side part of the connection part 11U so as to follow the other side part 302R of the second body part 302. The connection part 11U is provided with a groove portion 11H into which the first guide 51A is inserted. The groove portion 11H is opened by a width in which the first guide 51A is inserted, and both left and right sides of the first guide 51A are supported by metal, as shown in FIG. 13.

The first cover part 12L is an example of the cover part, and is formed to cover a predetermined portion of the first sidewall part 11L of the cover guide part 11. The second cover part 12R is an example of the cover part, and is formed to cover a predetermined portion of the second sidewall part 11R of the cover guide part 11.

The cover guide part 11 has a first contact part 13L provided at an end portion on a front side of the first sidewall part 11L. The cover guide part 11 also has a second contact part 13R provided at an end portion on a front side of the second sidewall part 11R.

The first contact part 13L is constituted by bending the end portion on the front side of the first sidewall part 11L toward the second sidewall part 11R, and is formed to cover an end portion on a front side of one side part 302L of the second body part 302. The second contact part 13R is constituted by bending the end portion on the front side of the second sidewall part 11R toward the first sidewall part 11L, and is formed to cover an end portion on a front side of the other side part 302R of the second body part 302.

The cover guide part 11 has a first guide concave portion 14L1 and a second guide concave portion 14L2 provided to the first sidewall part 11L. The first guide concave portion 14L1 and the second guide concave portion 14L2 are examples of the guide or guide part, and are each constituted by a long hole-shaped opening extending in a moving direction of the first contact member 9AL, which is the first direction denoted with the arrow A1.

The first cover part 12L has a third guide concave portion 14L3. The third guide concave portion 14L3 is an example of the guide or guide part, and is constituted by a long hole-shaped concave portion extending in the moving direction of the first contact member 9AL.

The cover guide part 11 has a spring support portion 15L1 provided to the first sidewall part 11L. The spring support portion 15L1 is constituted by a concave portion in which a spring 95AL such as a compression coil spring is inserted with a direction in which the spring 95AL expands and contracts as the direction along the moving direction of the first contact member 9AL.

The first cover part 12L has a spring support portion 15L2. The spring support portion 15L2 is constituted by a concave portion in which the spring 95AL is inserted with the direction in which the spring 95AL expands and contracts as the direction along the moving direction of the first contact member 9AL.

Figure 9A:
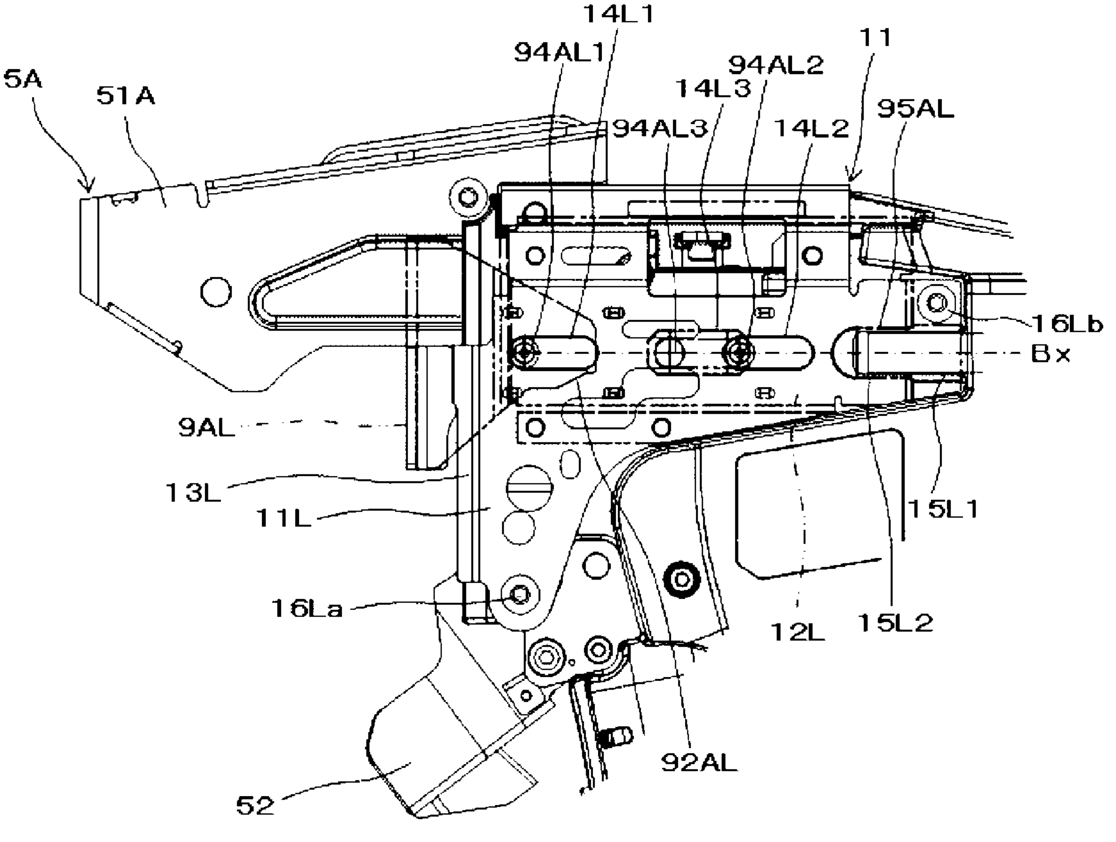
FIG. 9A illustrates the configuration of the main parts and an operational effect of the reinforcing bar binding machine of the first embodiment.

When the first cover part 12L is attached to the first sidewall part 11L, the first guide concave portion 14L1, the second guide concave portion 14L2, the third guide concave portion 14L3, and the spring support portions 15L1 and 15L2 are arranged on the same axis Bx along the moving direction of the first contact member 9AL, as shown in FIG. 9A.

The cover guide part 11 has a first guide concave portion 14R1 and a second guide concave portion 14R2 provided at the second sidewall part 11R. The first guide concave portion 14R1 and the second guide concave portion 14R2 are examples of the guide part, and are each constituted by a long hole-shaped opening extending in the moving direction of the second contact member 9AR.

The second cover part 12R has a third guide concave portion 14R3. The third guide concave portion 14R3 is an example of the guide part, and is constituted by a long hole-shaped concave portion extending in the moving direction of the second contact member 9AR.

The cover guide part 11 has a spring support portion 15R1 provided to the second sidewall part 11R. The spring support portion 15R1 is constituted by a concave portion in which a spring 95AR such as a compression coil spring is inserted with a direction in which the spring 95AR expands and contracts as the direction along the moving direction of the second contact member 9AR.

The second cover part 12R has a spring support portion 15R2. The spring support portion 15R2 is constituted by a concave portion in which the spring 95AR is inserted with the direction in which the spring 95AR expands and contracts as the direction along the moving direction of the second contact member 9AR.

Figure 9B:
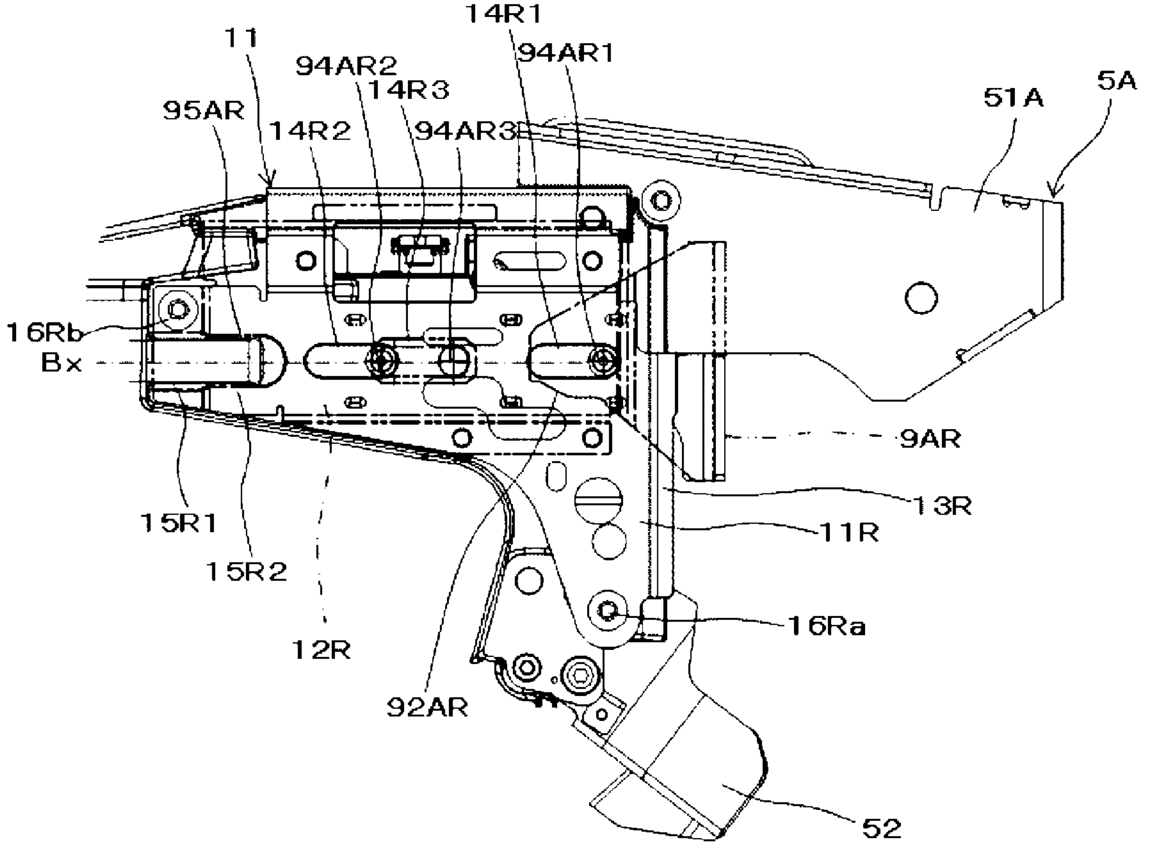
FIG. 9B illustrates the configuration of the main parts and an operational effect of the reinforcing bar binding machine of the first embodiment.
Figure 10:
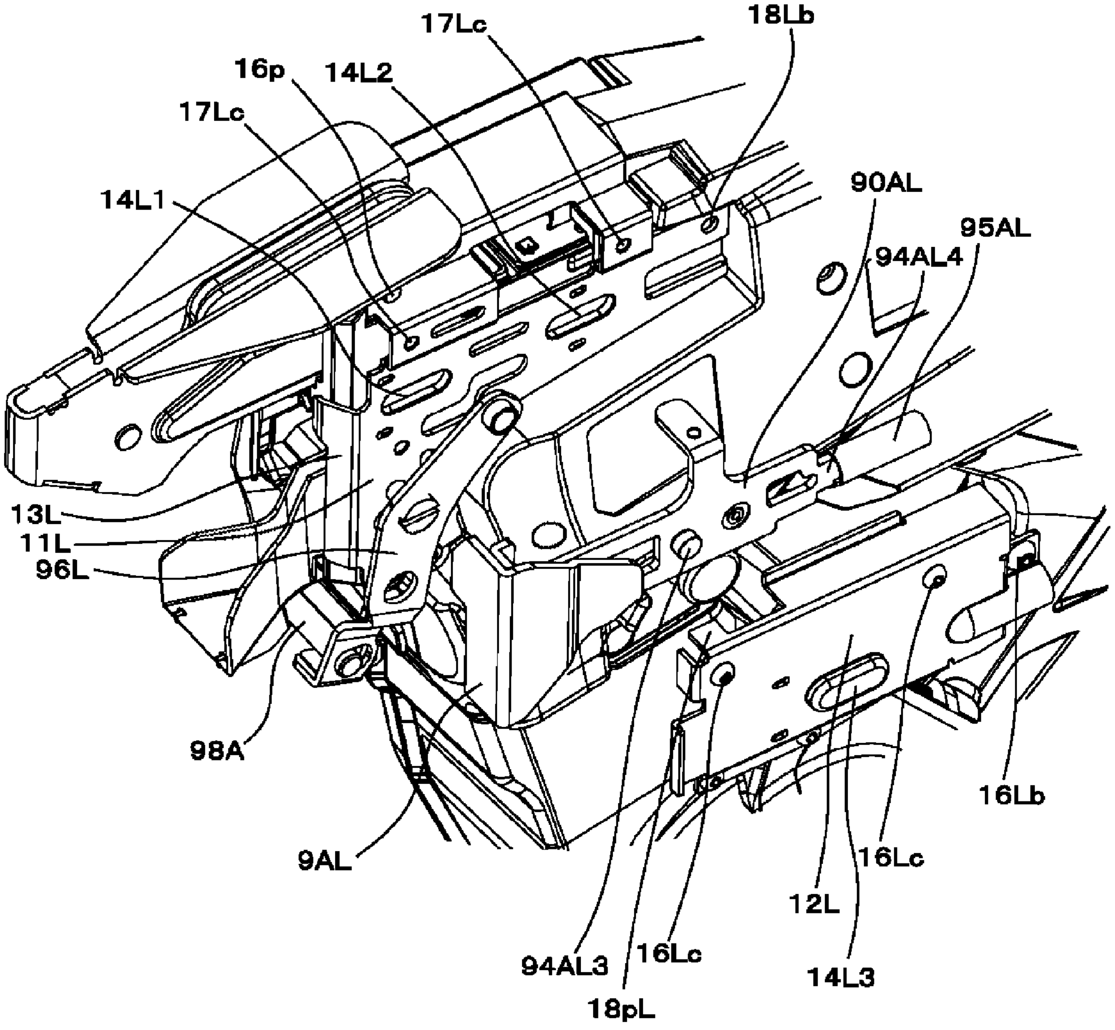
FIG. 10 illustrates the configuration of the main parts and an operational effect of the reinforcing bar binding machine of the first embodiment.

When the second cover part 12R is attached to the second sidewall part 11R, the first guide concave portion 14R1, the second guide concave portion 14R2, the third guide concave portion 14R3, and the spring support portions 15R1 and 15R2 are arranged on the same axis along the moving direction of the second contact member 9AR, as shown in FIG. 9B.

Subsequently, the contact member is described in detail. The first contact member 9AL has a guided part 90AL to which the contact part 91AL and the acting part 92AL are provided, and a detection part 93AL. The second contact member 9AR has a guided part 90AR to which the contact part 91AR and the acting part 92AR are provided, and a detection part 93AR.

The guided part 90AL formed of plate-shaped metal of the first contact member 9AL is attached between the first sidewall part 11L of the cover guide part 11 and the first cover part 12L.

The first contact member 9AL has a first guide convex portion 94AL1 and a second guide convex portion 94AL2 provided on one surface of the guided part 90AL facing toward the first sidewall part 11L of the cover guide part 11.

The first guide convex portion 94AL1 protrudes in a direction orthogonal to the moving direction of the first contact member 9AL, and is inserted into the first guide concave portion 14L1 of the first sidewall part 11L. The second guide convex portion 94AL2 protrudes in a direction orthogonal to the moving direction of the first contact member 9AL, and is inserted into the second guide concave portion 14L2 of the first sidewall part 11L.

The first contact member 9AL also has a third guide convex portion 94AL3 provided on the other surface of the guided part 90AL facing toward the first cover part 12L attached to the first sidewall part 11L of the cover guide part 11. The third guide convex portion 94AL3 protrudes in a direction orthogonal to the moving direction of the first contact member 9AL, and is inserted into the third guide concave portion 14L3 of the first cover part 12L.

The first contact member 9AL also has a spring attaching portion 94AL4 on a rear end-side of the guided part 90AL. The spring 95AL is attached to the spring attaching portion 94AL4 with the direction in which the spring 95AL expands and contracts as the direction along the moving direction of the first contact member 9AL.

In the first contact member 9AL, the first guide convex portion 94AL1, the second guide convex portion 94AL2, the third guide convex portion 94AL3, the spring attaching portion 94AL4 and the spring 95AL attached to the spring attaching portion 94AL4 are arranged on a straight line along the moving direction of the first contact member 9AL.

The first contact member 9AL has the contact part 91AL provided on a front end-side of the guided part 90AL. The contact part 91AL is constituted by a surface in a direction of intersecting with the moving direction of the first contact member 9AL.

The first contact member 9AL has the acting part 92AL provided on a side part of the guided part 90AL integrally with the contact part 91AL. The acting part 92AL has an inclined surface inclined relative to the moving direction of the first contact member 9AL. Alternatively, the acting part 92AL has an inclined surface inclined relative to the moving direction of the first contact member 9AL and a vertical surface. Note that, the acting part 92AL may not have the inclined surface inclined relative to the moving direction of the first contact member 9AL but have a vertical surface and a horizontal surface. The first contact member 9AL has a gap, in which the first cover part 12L can be inserted, formed between the guided part 90AL and the acting part 92AL.

The first contact member 9AL has the detection part 93AL provided integrally with the guided part 90AL. The detection part 93AL protrudes toward the second contact member 9AR with intersecting with the moving direction of the first contact member 9AL.

The guided part 90AR formed of plate-shaped metal of the second contact member 9AR is attached between the second sidewall part 11R of the cover guide part 11 and the second cover part 12R.

The second contact member 9AR has a first guide convex portion 94AR1 and a second guide convex portion 94AR2 provided on one surface of the guided part 90AR facing toward the second sidewall part 11R of the cover guide part 11.

The first guide convex portion 94AR1 protrudes in a direction orthogonal to the moving direction of the second contact member 9AR, and is inserted into the first guide concave portion 14R1 of the second sidewall part 11R. The second guide convex portion 94AR2 protrudes in a direction orthogonal to the moving direction of the second contact member 9AR, and is inserted into the second guide concave portion 14R2 of the second sidewall part 11R.

The second contact member 9AR also has a third guide convex portion 94AR3 provided on the other surface of the guided part 90AR facing toward the second cover part 12R attached to the second sidewall part 11R of the cover guide part 11. The third guide convex portion 94AR3 protrudes in a direction orthogonal to the moving direction of the second contact member 9AR, and is inserted into the third guide concave portion 14R3 of the second cover part 12R.

The second contact member 9AR also has a spring attaching portion 94AR4 on a rear end-side of the guided part 90AR. The spring 95AR is attached to the spring attaching portion 94AR4 with the direction in which the spring 95AR expands and contracts as the direction along the moving direction of the second contact member 9AR.

In the second contact member 9AR, the first guide convex portion 94AR1, the second guide convex portion 94AR2, the third guide convex portion 94AR3, the spring attaching portion 94AR4 and the spring 95AR attached to the spring attaching portion 94AR4 are arranged on a straight line along the moving direction of the second contact member 9AR.

The second contact member 9AR has the contact part 91AR provided on a front end-side of the guided part 90AR. The contact part 91AR is constituted by a surface in a direction of intersecting with the moving direction of the second contact member 9AR.

The second contact member 9AR has the acting part 92AR provided on a side part of the guided part 90AR integrally with the contact part 91AR. The acting part 92AR has an inclined surface inclined relative to the moving direction of the second contact member 9AR. Alternatively, the acting part 92AR has an inclined surface inclined relative to the moving direction of the second contact member 9AR and a vertical surface. Note that, the acting part 92AR may not have the inclined surface inclined relative to the moving direction of the second contact member 9AR but have a vertical surface and a horizontal surface. The second contact member 9AR has a gap, in which the second cover part 12R can be inserted, formed between the guided part 90AR and the acting part 92AR.

The second contact member 9AR has the detection part 93AR provided integrally with the guided part 90AR. The detection part 93AR protrudes toward the first contact member 9AL with intersecting with the moving direction of the second contact member 9AR.

Subsequently, an attachment structure of the cover guide part 11 and the like is described. A position of the cover guide part 11 with respect to the second body part 302 is defined by a positioning pin 16*p*. The cover guide part 11 is attached at the first sidewall part 11L to one side part 302L of the second body part 302 by a screw 16La. The cover guide part 11 is also attached at the first sidewall part 11L to one side part 302L of the second body part 302 by a screw 16Lb via the first cover part 12L.

For this reason, the cover guide part 11 is provided with a hole portion 17*p* in predetermined arrangement through which the positioning pin 16*p* passes. The second body part 302 is also provided with a hole portion 18*p* in predetermined arrangement through which the positioning pin 16*p* passes. The hole 18*p* is constituted by a hole larger than a diameter of the positioning pin 16*p*, and the first guide 51A, in the present example, the guide arm 51*d* constituting the first guide 51A is provided with a hole portion (not shown) substantially equivalent to the diameter of the positioning pin 16*p*, in conformity to a position of the hole portion 18*p*. The first cover part 12L is also provided with a regulation portion 18*p*L for suppressing the positioning pin 16*p* from coming off, and the second cover part 12R is provided with a regulation portion 18*p*R for suppressing the positioning pin 16*p* coming off.

The first sidewall part 11L of the cover guide part 11 is formed with hole portions in predetermined arrangement, through which the screws 16La and 16Lb pass. The first cover part 12L is also formed with a hole portion in predetermined arrangement, through which the screw 16Lb passes. One side part 302L of the second body part 302 is also formed with screw holes in predetermined arrangement, to which the screws 16La and 16Lb are fastened.

The first cover part 12L is attached to the first sidewall part 11L of the cover guide part 11 by a screw 16Lc. For this reason, the first cover part 12L is formed with a hole portion in predetermined arrangement, through which the screw 16Lc passes. In addition, the first sidewall part 11L is formed with a screw hole 17Lc in predetermined arrangement, to which the screw 16Lc is fastened.

Specifically, the cover guide part 11 is put on a predetermined position of the second body part 302 and the positioning pin 16*p* is enabled to pass through the hole portion 17*p*, so that a position of the cover guide part 11 with respect to the second body part 302 is defined via the hole portion (not shown) of the guide arm 51*d*. The screw 16La passes through the hole portion (not shown) penetrating the first sidewall part 11L of the cover guide part 11 and is then fastened to the screw hole (not shown) provided to one side part 302L of the second body part 302. Note that, in order to operate the screw 16La without detaching the link part 96, the link part 96 is provided with an opening portion 99 penetrating the first link member 96L and the second link member 96R.

In addition, the screw 16Lb passing through the hole portion (not shown) penetrating the first cover part 12L passes through the hole portion 18Lb penetrating the first sidewall part 11L of the cover guide part 11 and is then fastened to the screw hole (not shown) provided to one side part 302L of the second body part 302.

Further, the screw 16Lc passes through the hole portion (not shown) penetrating the first cover part 12L and is then fastened to the screw hole 17Lc provided to the first sidewall part 11L of the cover guide part 11.

The cover guide part 11 is attached at the second sidewall part 11R to the other side part 302R of the second body part 302 by a screw 16Ra. The cover guide part 11 is also attached at the second sidewall part 11R to the other side part 302R of the second body part 302 via the second cover part 12R by a screw 16Rb.

For this reason, the second sidewall part 11R of the cover guide part 11 is provided with hole portions in predetermined arrangement through which the screws 16Ra and 16Rb pass. The second cover part 12R is provided with a hole portion in predetermined arrangement through which the screw 16Rb passes. In addition, the other side part 302R of the second body part 302 is provided with screw holes in predetermined arrangement to which the screws 16Ra and 16Rb are fastened.

The second cover part 12R is attached to the second sidewall part 11R of the cover guide part 11 by a screw 16Rc. For this reason, the second cover part 12R is provided with a hole portion in predetermined arrangement through which the screw 16Rc passes. In addition, the second sidewall part 11R is provided with a screw hole in predetermined arrangement to which the screw 16Rc is fastened.

Specifically, the screw 16Ra passes through the hole portion (not shown) penetrating the second sidewall part 11R of the cover guide part 11 and is then fastened to the screw hole (not shown) provided to the other side part 302R of the second body part 302.

In addition, the screw 16Rb passing through the hole portion (not shown) penetrating the second cover part 12R passes through the hole portion 18Rb penetrating the second sidewall part 11R of the cover guide part 11, and is then fastened to the screw hole (not shown) provided to the other side part 302R of the second body part 302.

Further, the screw 16Rc passes through the hole portion (not shown) penetrating the second cover part 12R and is then fastened to the screw hole (not shown) provided to the second sidewall part 11R of the cover guide part 11.

Thereby, the cover guide part 11 is attached to the second body part 302 in such an aspect that the first sidewall part 11L covers a part of one side part 302L of the second body part 302, the second sidewall part 11R covers a part of the other side part 302R of the second body part 302 and the connection part 11U covers a part of the upper surface part 302U of the second body part 302.

In addition, the first cover part 12L is attached to the first sidewall part 11L of the cover guide part 11, and the second cover part 12R is attached to the second sidewall part 11R of the cover guide part 11.

When the first cover part 12L is attached to the first sidewall part 11L, the first guide convex portion 94AL1 of the first contact member 9AL is inserted in the first guide concave portion 14L1 of the first sidewall part 11L of the cover guide part 11 and the second guide convex portion 94AL2 is inserted in the second guide concave portion 14L2 of the first sidewall part 11L.

In addition, the spring 95AL attached to the spring attaching portion 94AL4 of the first contact member 9AL is inserted in the spring support portion 15L1 of the first sidewall part 11L. The third guide convex portion 94AL3 of the first contact member 9AL is inserted in the third guide concave portion 14L3 of the first cover part 12L. The spring 95AL attached to the spring attaching portion 94AL4 is inserted in the spring support portion 15L2 of the first cover part 12L.

Thereby, the first contact member 9AL is supported to be movable in the extension direction of the first guide concave portion 14L1, the second guide concave portion 14L2 and the third guide concave portion 14L3.

Furthermore, in the first contact member 9AL, the portions configured to guide movement of the first contact member 9AL such as the first guide convex portion 94AL1 and the first guide concave portion 14L1, and the spring 95AL are covered by the first cover part 12L. In the first contact member 9AL, the contact part 91AL and the acting part 92AL are exposed from the first cover part 12L.

In addition, the contact part 91AL of the first contact member 9AL is urged by the spring 95AL in a protruding direction from the first contact part 13L of the first sidewall part 11L. When the first cover part 12L is attached to the first sidewall part 11L, the regulation portion 18*p*L faces the end portion of the positioning pin 16*p*, and separation of the positioning pin 16*p* is suppressed.

When the second cover part 12R is attached to the second sidewall part 11R, the first guide convex portion 94AR1 of the second contact member 9AR is inserted in the first guide concave portion 14R1 of the second sidewall part 11R of the cover guide part 11 and the second guide convex portion 94AR2 is inserted in the second guide concave portion 14R2 of the second sidewall part 11R.

In addition, the spring 95AR of the second contact member 9AR attached to the spring attaching portion 94AR4 is inserted in the spring support portion 15R1 of the second sidewall part 11R. Also, the third guide convex portion 94AR3 of the second contact member 9AR is inserted in the third guide concave portion 14R3 of the second cover part 12R. The spring 95AR attached to the spring attaching portion 94AR4 is inserted in the spring support portion 15R2 of the second cover part 12R.

Thereby, the second contact member 9AR is supported to be movable in the extension direction of the first guide concave portion 14R1, the second guide concave portion 14R2 and the third guide concave portion 14R3.

The first contact member 9AL and the second contact member 9AR are independent components and can independently operate.

In the second contact member 9AR, the portions configured to guide movement of the second contact member 9AR such as the first guide convex portion 94AR1 and the first guide concave portion 14R1, and the spring 95AR are covered by the second cover part 12R. In the second contact member 9AR, the contact part 91AR and the acting part 92AR are exposed from the second cover part 12R.

In addition, the contact part 91AR of the second contact member 9AR is urged by the spring 95AR in a protruding direction from the second contact part 13R of the second sidewall part 11R. When the second cover part 12R is attached to the second sidewall part 11R, the regulation portion 18*p*R faces the end portion of the positioning pin 16*p*, and separation of the positioning pin 16*p* is suppressed.

Figure 12:
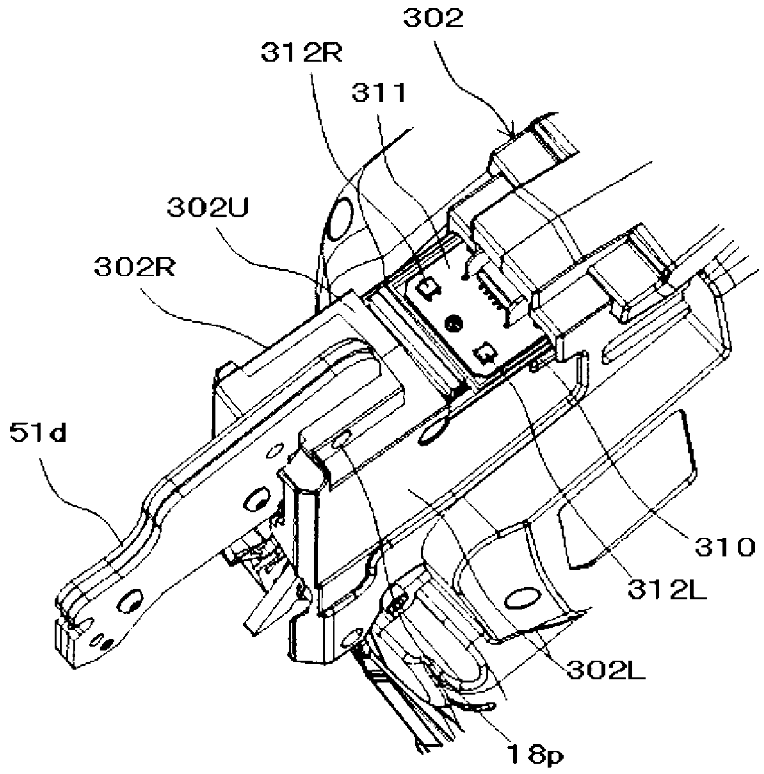
FIG. 12 illustrates the configuration of the main parts and an operational effect of the reinforcing bar binding machine of the first embodiment.

Subsequently, a configuration of detecting the pair of contact members is described. The second body part 302 has a sensor attaching part 310. As shown in FIG. 12, the sensor attaching part 310 is constituted by providing the upper surface part 302U of the second body part 302 with an opening having a concave shape, and is attached in such an aspect that a sensor substrate unit 311 is exposed.

The sensor substrate unit 311 includes a first sensor 312L configured to detect the detection part 93AL of the first contact member 9AL, and a second sensor 312R configured to detect the detection part 93AR of the second contact member 9AR.

The first sensor 312L is constituted by a magnetic sensor, for example, and an output thereof changes depending on whether or not the detection part 93AL. When the first contact member 9AL is attached to the cover guide part 11, the detection part 93AL enters the sensor attaching part 310. When the first contact member 9AL is moved in the first direction denoted with the arrow A1, the detection part 93AL is moved between a position at which the detection part 93AL faces the first sensor 312L in a contactless manner and a position at which the detection part 93AL does not face the first sensor 312L.

In the present example, in a state where the first contact member 9AL is moved to the standby position, the detection part 93AL is located at the position at which it does not face the first sensor 312L. In a state where the first contact member 9AL is moved to the actuation position, the detection part 93AL is located at the position at which it faces the first sensor 312L. Note that, in the state where the first contact member 9AL is moved to the standby position, the detection part 93AL may be located at the position at which it does not face the first sensor 312L, and in the state where the first contact member 9AL is moved to the actuation position, the detection part 93AL may pass the position at which it faces the first sensor 312L. Also, in the state where the first contact member 9AL is moved to the standby position, the detection part 93AL may be located at the position at which it faces the first sensor 312L, and in the state where the first contact member 9AL is moved to the actuation position, the detection part 93AL may be located at the position at which it does not face the first sensor 312L.

The second sensor 312R is constituted by a magnetic sensor, for example, and an output thereof changes depending on whether or not the detection part 93AR. When the second contact member 9AR is attached to the cover guide part 11, the detection part 93AR enters the sensor attaching part 310. When the first contact member 9AL is moved in the first direction denoted with the arrow A1, the detection part 93AR is moved between a position at which the detection part 93AR faces the second sensor 312R in a contactless manner and a position at which the detection part 93AR does not face the second sensor 312R.

In the present example, in a state where the second contact member 9AR is moved to the standby position, the detection part 93AR is located at the position at which it does not face the second sensor 312R. In a state where the second contact member 9AR is moved to the actuation position, the detection part 93AL is located at the position at which it faces the second sensor 312R. Note that, in the state where the second contact member 9AR is moved to the standby position, the detection part 93AR may be located at the position at which it does not face the second sensor 312R, and in the state where the second contact member 9AR is moved to the actuation position, the detection part 93AR may pass the position at which it faces the second sensor 312R. Also, in the state where the second contact member 9AR is moved to the standby position, the detection part 93AR may be located at the position at which it faces the second sensor 312R, and in the state where the second contact member 9AR is moved to the actuation position, the detection part 93AR may be located at the position at which it does not face the second sensor 312R.

Figure 16:
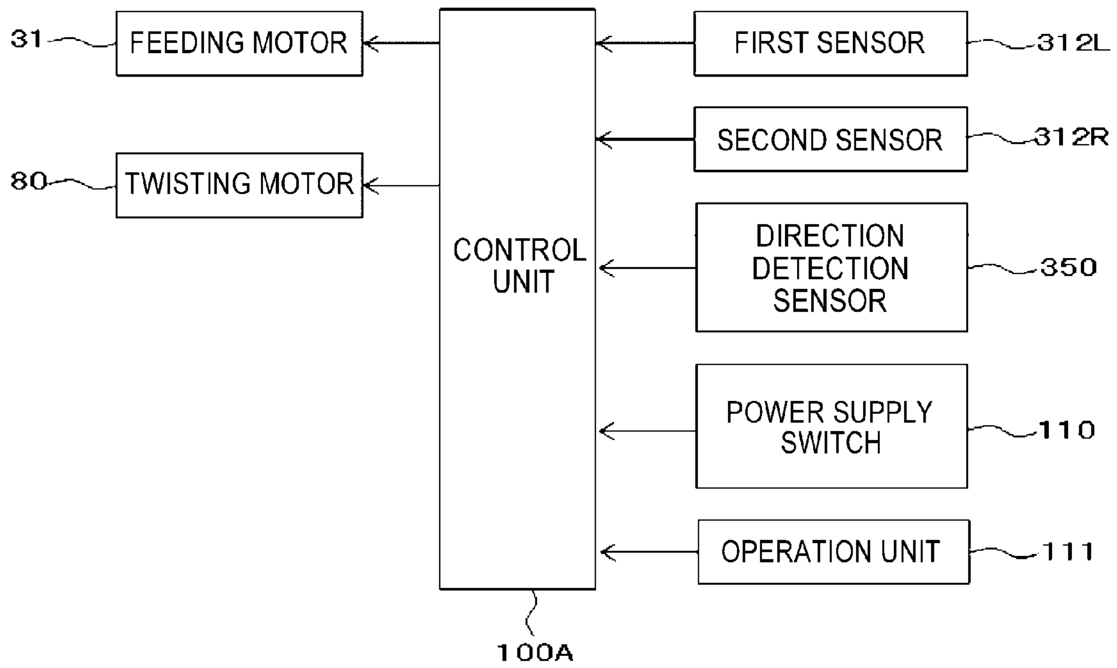
FIG. 16 is a functional block diagram of the reinforcing bar binding machine of the first embodiment.

FIG. 16 is a functional block diagram of the reinforcing bar binding machine of the first embodiment. In the reinforcing bar binding machine 1A, a control unit 100A is configured to detect outputs of the first sensor 312L configured to detect the detection part 93AL as the first contact member 9AL is pressed to the reinforcing bars S, the second sensor 312R configured to detect the detection part 93AR as the second contact member 9AR is pressed to the reinforcing bars S, a direction detection sensor 350 configured to detect a direction of the reinforcing bar binding machine 1A, and the like.

The control unit 100A is configured to control the feeding motor 31 configured to drive the feeding gears 30 and the twisting motor 80 configured to drive the twisting unit 7 and the like, in response to the outputs of the first sensor 312L and the second sensor 312R and the output of the direction detection sensor 350, thereby executing a series of operations of binding the reinforcing bars S with the wire W.

In the present example, in the state where the first contact member 9AL is moved to the standby position shown in FIG. 1A and the like, the detection part 93AL is located at the position at which it does not face the first sensor 312L. In this state, the output of the first sensor 312L is set to an off state. In the state where the first contact member 9AL is moved to the actuation position shown in FIG. 1C, the detection part 93AL is located at the position at which it faces the first sensor 312L. In this state, the output of the first sensor 312L is set to an on state. Note that, in the configuration where the first contact member 9AL is moved to the actuation position, so that the detection part 93AL passes the position at which it faces the first sensor 312L, when the detection part 93AL is moved to the position at which it faces the first sensor 312L, the output of the first sensor 312L is set to an on state. In addition, even when the detection part 93AL passes the position at which it faces the first sensor 312L, the output of the first sensor 312L is kept at the on state. In the configuration where the first contact member 9AL is moved to the standby position, so that the detection part 93AL is located at the position at which it faces the first sensor 312L, and the first contact member 9AL is moved to the actuation position, so that the detection part 93AL is located at the position at which it does not face the first sensor 312L, the output of the first sensor 312L is set to an off state at the position at which the detection part 93AL faces the first sensor 312L. In addition, when the detection part 93AL is moved to the position at which it does not face the first sensor 312L, the output of the first sensor 312L is set to an on state.

In the state where the second contact member 9AR is moved to the standby position shown in FIG. 1B, the detection part 93AR is located at the position at which it does not face the second sensor 312R. In this state, the output of the second sensor 312R is set to an off state. In the state where the second contact member 9AR is moved to the actuation position shown in FIG. 1D, the detection part 93AR is located at the position at which it faces the second sensor 312R. In this state, the output of the second sensor 312R is set to an on state. Note that, in the configuration where the second contact member 9AR is moved to the actuation position, so that the detection part 93AR passes the position at which it faces the second sensor 312R, when the detection part 93AR is moved to the position at which it faces the second sensor 312R, the output of the second sensor 312R is set to an on state. In addition, even when the detection part 93AR passes the position at which it faces the second sensor 312R, the output of the second sensor 312R is kept at the on state. In the configuration where the second contact member 9AR is moved to the standby position, so that the detection part 93AR is located at the position at which it faces the second sensor 312R, and the second contact member 9AR is moved to the actuation position, so that the detection part 93AR is located at the position at which it does not face the second sensor 312R, the output of the second sensor 312R is set to an off state at the position at which the detection part 93AR faces the second sensor 312R. In addition, when the detection part 93AR is moved to the position at which it does not face the second sensor 312R, the output of the second sensor 312R is set to an on state.

Further, in a state where a direction of the reinforcing bar binding machine 1A is within a predetermined binding allowable range in which the guide part 5A faces downward, the output of the direction detection sensor 350 is set to an on state, and in a state where the direction of the reinforcing bar binding machine 1A is outside the predetermined binding allowed range, the output of the direction detection sensor 350 is set to an off state.

Figure 17A:
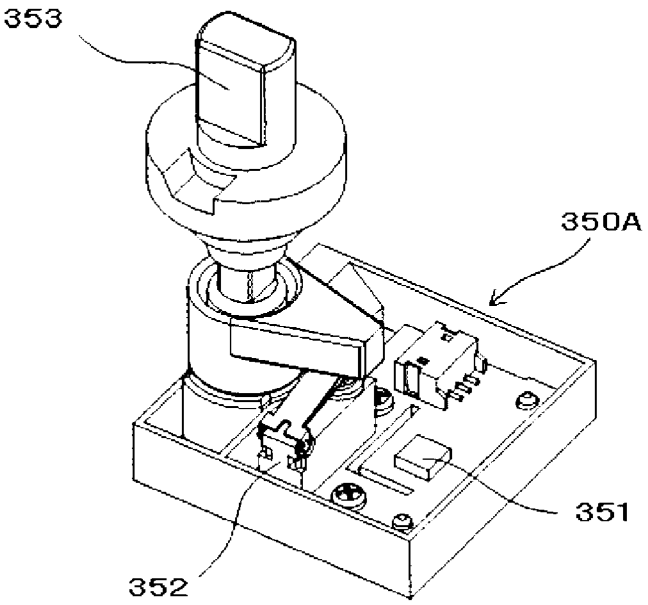
FIG. 17A is a perspective view depicting a direction detection sensor of the first embodiment.

FIG. 17A is a perspective view depicting a direction detection sensor of the first embodiment. A direction detection sensor 350A of the first embodiment includes an acceleration sensor 351, a switch 252 configured to switch whether or not detection by the acceleration sensor 351, and an operation unit 353 configured to switch on and off states of the switch 352.

The direction detection sensor 350A is provided to the second body part 302. In the present example, the direction detection sensor 350A is provided to an electric component unit 360 shown in FIG. 1A. In the electric component unit 360, a substrate on which the control unit 100A, a circuit configured to drive the feeding motor 31 and the twisting motor 80, components and the like are mounted is accommodated.

The acceleration sensor 351 is configured to detect a direction of the reinforcing bar binding machine 1A by detecting acceleration in at least one axis direction. The on and off states of the switch 352 are switched by the operation unit 353, so that it is switched whether to validate or invalidate detection by the acceleration sensor 351.

Figure 17B:
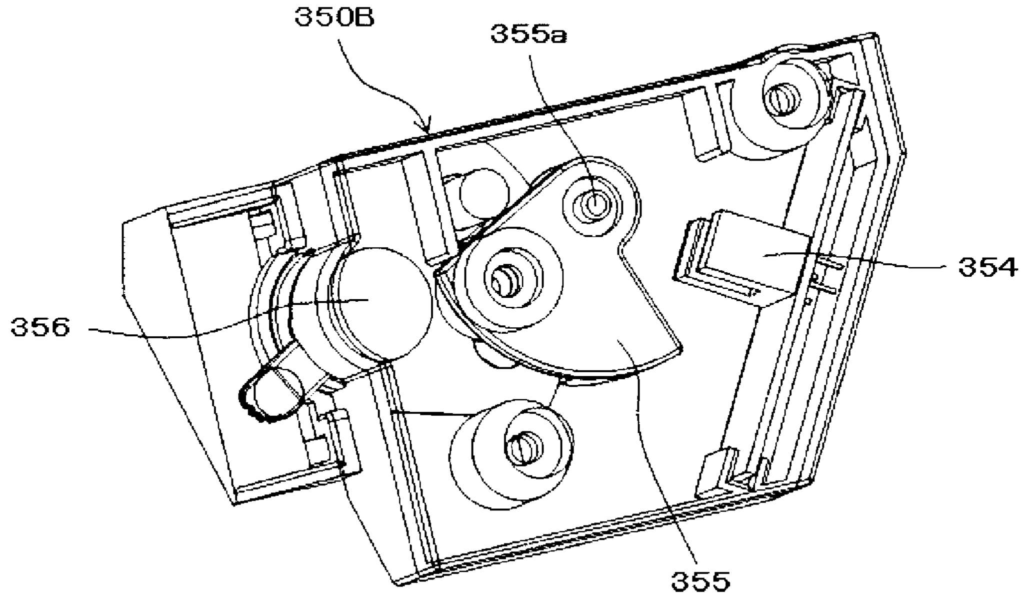
FIG. 17B is a perspective view depicting a direction detection sensor of a second embodiment.

FIG. 17B is a perspective view depicting a direction detection sensor of a second embodiment. A direction detection sensor 350B of the second embodiment includes a photo sensor 354, a pendulum 355 that is detected by the photo sensor 354, and an operation unit 356 configured to switch whether or not actuation of the pendulum 355.

The direction detection sensor 350B is provided to the second body part 302. In the present example, the direction detection sensor 350B is provided to the electric component unit 360 shown in FIG. 1A.

The pendulum 355 is configured to rotate about a shaft 355*a* as a support point, according to a direction of the reinforcing bar binding machine 1A, and it is switched whether to perform detection by the photo sensor 354 is switched, so that the direction of the reinforcing bar binding machine 1A is detected. It is switched whether to actuate the pendulum 355 by the operation unit 356, so that it is switched whether to validate or invalidate the detection by the photo sensor 354.

Subsequently, operations of binding the reinforcing bars S with the wire W by the reinforcing bar binding machine 1A are described. The operator grips the handle parts 304*h*L and 304*h*R of the reinforcing bar binding machine 1A with both hands, aligns a position of the guide part 5A with an intersection point of the two reinforcing bars S, and inserts the reinforcing bars S into the insertion/pulling-out opening 53.

In order to bind the reinforcing bars S at the feet of the operator, the reinforcing bar binding machine 1A is used with the guide part 5A facing downward in a state where the operator stands. In the state where the second guide 52 is moved to the second position, the interval of the insertion/pulling-out opening 53 in the second direction denoted with the arrow A2 is narrower, as compared to the state where the second guide 52 is moved to the first position. For this reason, when inserting the reinforcing bars S, it is difficult to insert the reinforcing bars S into the insertion/pulling-out opening 53 in a binding machine of the related art where the second guide 52 has been moved to the second position. Therefore, according to the reinforcing bar binding machine 1A, in a state where the reinforcing bars S are not inserted in the insertion/pulling-out opening 53, as shown in FIGS. 1A and 1B and the like, the second guide 52 is moved to the first position, so that an interval between the end portion 52*c* of the second guide 52 and the end portion 51*c* of the first guide 51A increases. In addition, according to the reinforcing bar binding machine 1A, the tip end-side of the first guide 51A is provided with the induction part 59 having a shape capable of guiding the reinforcing bars S into the insertion/pulling-out opening 53. Thereby, since the operator can cause the reinforcing bars S to butt against the induction part 59 and the induction part 59 to slide on the reinforcing bars S, it is easier to insert the reinforcing bars S into the insertion/pulling-out opening 53.

During the operation of inserting the reinforcing bars S into the insertion/pulling-out opening 53 between the first guide 51A and the second guide 52, the reinforcing bar binding machine 1A is moved in the first direction denoted with the arrow A1. Due to the relative movement of the reinforcing bar binding machine 1A and the reinforcing bars S, the contact part 91AL is pushed by a force along the first direction denoted with the arrow A1, so that the first contact member 9AL is moved to the actuation position. The contact part 91AR is also pushed by a force along the first direction denoted with the arrow A1, so that the second contact member 9AR is moved to the actuation position.

When the first contact member 9AL is moved to the actuation position, the output of the first sensor 312L is changed from an off state to an on state. Also, when the first contact member 9AL is moved to the actuation position, the acting part 92AL pushes the acted part 97L of the first link member 96L, so that the first link member 96L rotates about the shaft 96A as a support point. The rotation of the first link member 96L about the shaft 96A as a support point causes the acting shaft 98A to move toward the first guide 51A. Thereby, the acting shaft 98A pushes the receiving part 56 of the second guide 52, so that the second guide 52 is moved to the second position.

When the second contact member 9AR is moved to the actuation position, the output of the second sensor 312R is changed from an off state to an on state. Also, when the second contact member 9AR is moved to the actuation position, the acting part 92AR pushes the acted part 97R of the second link member 96R, so that the second link member 96R rotates about the shaft 96A as a support point. The rotation of the second link member 96R about the shaft 96A as a support point causes the acting shaft 98A to move toward the first guide 51A. Thereby, the acting shaft 98A pushes the receiving part 56 of the second guide 52, so that the second guide 52 is moved to the second position.

Note that, since first link member 96L and the second link member 96R of the link part 96 are connected, when any one of the first contact member 9AL and the second contact member 9AR is moved to the actuation position, the second guide 52 is moved to the second position.

Figure 18:
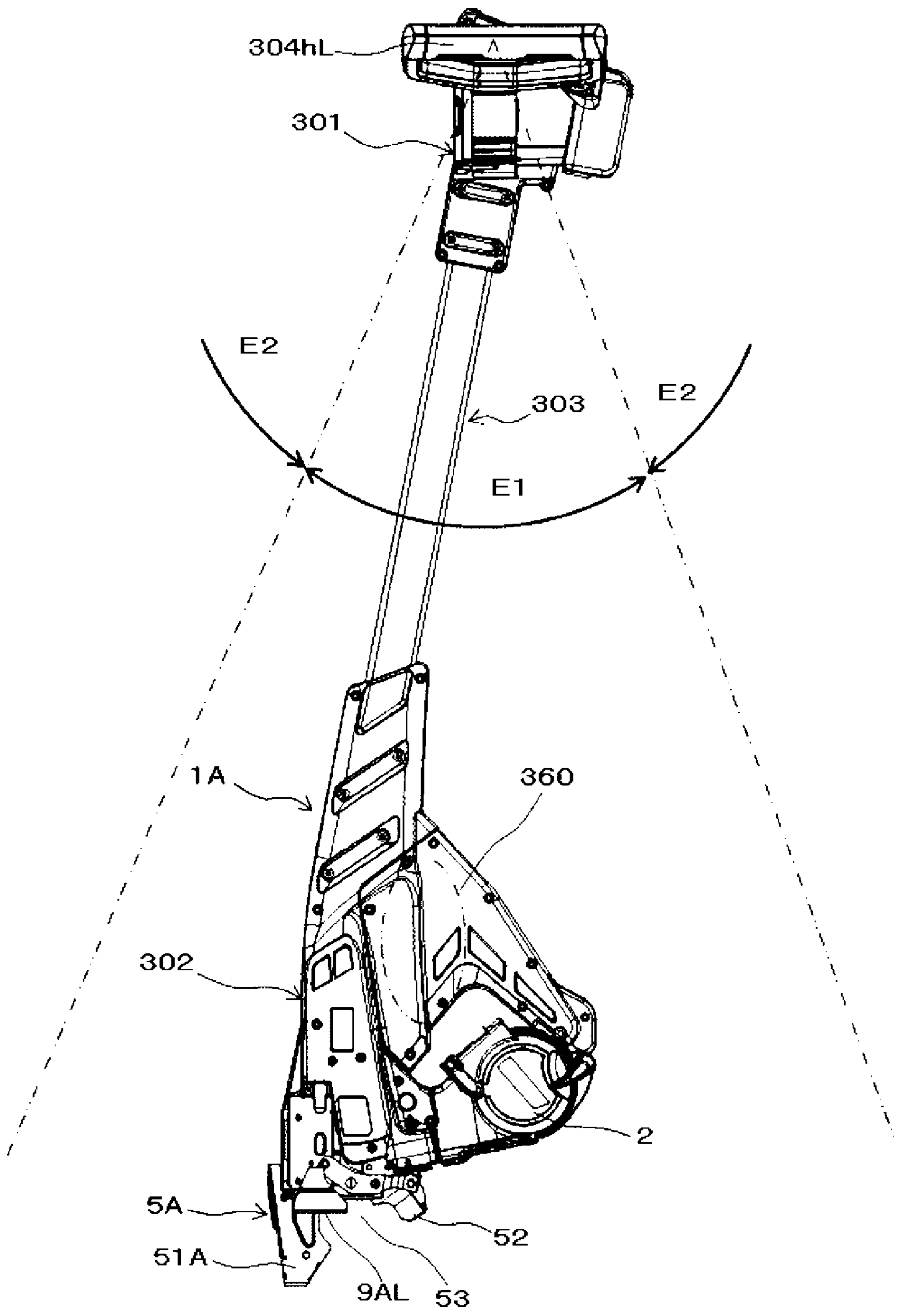
FIG. 18 illustrates a binding allowable range of the reinforcing bar binding machine of the first embodiment.
Figure 19A:
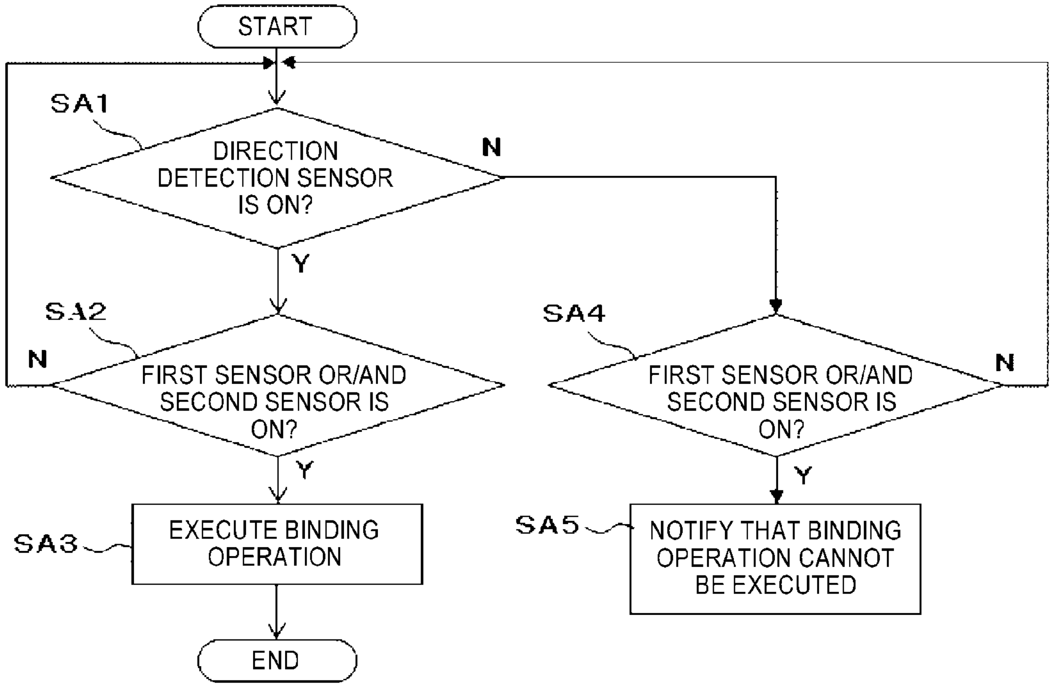
FIG. 19A is a flowchart depicting an example of operations of the reinforcing bar binding machine of the first embodiment.

FIG. 18 illustrates a binding allowable range of the reinforcing bar binding machine of the first embodiment, and FIG. 19A is a flowchart depicting an example of operations of the reinforcing bar binding machine of the first embodiment. In the below, an example of the operations of binding the reinforcing bars S with the wire W by the reinforcing bar binding machine 1A is described.

In step SA1 of FIG. 19A, the control unit 100A detects whether the direction detection sensor 350 (350A or 350B) is in an on state when a direction of the reinforcing bar binding machine 1A is within a predetermined binding allowable range E1.

In a state where the direction detection sensor 350 is in an on state and the direction of the reinforcing bar binding machine 1A is within the predetermined binding allowable range E1, when it is detected in step SA2 of FIG. 19A that the first sensor 312L becomes on as the first contact member 9AL is moved to the actuation position, the control unit 100A executes a series of operations of controlling the feeding motor 31 and the twisting motor 80 to bind the reinforcing bars S with the wire W, in step SA3.

Alternatively, in the state where the direction detection sensor 350 is in an on state and the direction of the reinforcing bar binding machine 1A is within the predetermined binding allowable range E1, when it is detected in step SA2 of FIG. 19A that the second sensor 312R becomes on as the second contact member 9AR is moved to the actuation position, the control unit 100A executes the series of operations in step SA3.

In addition, in the state where the direction detection sensor 350 is in an on state and the direction of the reinforcing bar binding machine 1A is within the predetermined binding allowable range E1, when it is detected in step SA2 of FIG. 19A that the first sensor 312L becomes on as the first contact member 9AL is moved to the actuation position and the second sensor 312R becomes on as the second contact member 9AR is moved to the actuation position, the control unit 100A may execute the series of operations in step SA3.

Here, the reinforcing bars S may butt against one of the first contact member 9AL or the second contact member 9AR but may not butt against the other, depending on directions of the two reinforcing bars S. In this case, the binding operation can be securely executed when the binding operation can be executed as any one of the first sensor 312L or the second sensor 312R becomes on.

In a state where the direction detection sensor 350 is not in the on state, i.e., the direction detection sensor 350 is in an off state and the direction the reinforcing bar binding machine 1A is within a range E2 outside the predetermined binding allowable range, when it is detected in step SA4 of FIG. 19A that the first sensor 312L becomes on as the first contact member 9AL is moved to the actuation position, the control unit 100A notifies in step SA5 that the binding operation cannot be executed by lighting of a lamp (not shown), a sound and the like.

Alternatively, in the state where the direction detection sensor 350 is not in the on state, i.e., the direction detection sensor 350 is in an off state and the direction the reinforcing bar binding machine 1A is within the range E2 outside the predetermined binding allowable range, when it is detected in step SA4 of FIG. 19A that the second sensor 312R becomes on as the second contact member 9AR is moved to the actuation position, the control unit 100A notifies in step SA5 that the binding operation cannot be executed by lighting of a lamp (not shown), a sound and the like.

In addition, in the state where the direction detection sensor 350 is not in the on state, i.e., the direction detection sensor 350 is in an off state and the direction the reinforcing bar binding machine 1A is within the range E2 outside the predetermined binding allowable range, when it is detected in step SA4 of FIG. 19A that the first sensor 312L becomes on as the first contact member 9AL is moved to the actuation position and the second sensor 312R becomes on as the second contact member 9AR is moved to the actuation position, the control unit 100A may notify in step SA5 that the binding operation cannot be executed by lighting of a lamp (not shown), a sound and the like.

After notifying that the binding operation cannot be executed, when it is detected that the first sensor 312L becomes off as the first contact member 9AL is moved to the standby position, it is detected that the second sensor 312R becomes off as the second contact member 9AR is moved to the standby position and the power supply is cut off and turned on by the operation on the power supply switch 110, the control unit 100A returns to step SA1. Then, in the state where the direction detection sensor 350 becomes on and the direction of the reinforcing bar binding machine 1A is within the predetermined binding allowable range E1, when it is detected that the first sensor 312L or the second sensor 312R or the first sensor 312L and the second sensor 312R become on as any one or both of the first contact member 9AL and the second contact member 9AR are moved to the actuation position, the binding operation is executed.

Alternatively, after notifying that the binding operation cannot be executed, when it is detected that the first sensor 312L becomes off as the first contact member 9AL is moved to the standby position and it is also detected that the second sensor 312R becomes off as the second contact member 9AR is moved to the standby position, the control unit 100A returns to step SA1. Then, in the state where the direction detection sensor 350 becomes on and the direction of the reinforcing bar binding machine 1A is within the predetermined binding allowable range E1, when it is detected that the first sensor 312L or the second sensor 312R or the first sensor 312L and the second sensor 312R become on as any one or both of the first contact member 9AL and the second contact member 9AR are moved to the actuation position, the binding operation is executed.

Alternatively, the control unit 100A returns to step SA1 after notifying that the binding operation cannot be executed. Then, in the state where the direction detection sensor 350 becomes on and the direction of the reinforcing bar binding machine 1A is within the predetermined binding allowable range E1, when it is detected that the first sensor 312L or the second sensor 312R or the first sensor 312L and the second sensor 312R become on as any one or both of the first contact member 9AL and the second contact member 9AR are moved to the actuation position, the binding operation is executed.

Figure 19B:
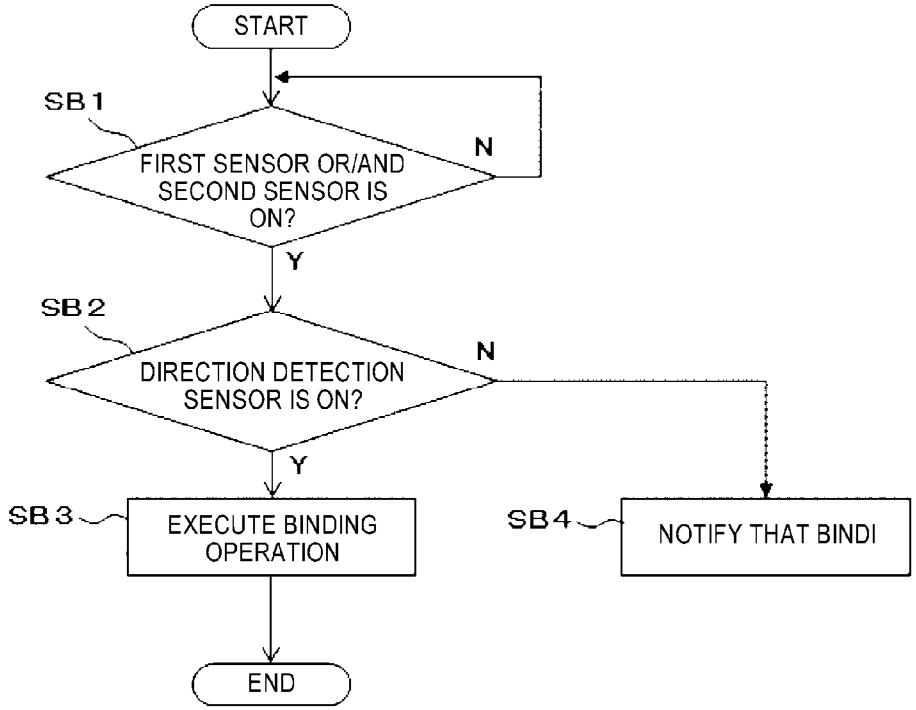
FIG. 19B is a flowchart depicting another example of operations of the reinforcing bar binding machine of the first embodiment.

FIG. 19B is a flowchart depicting another example of operations of the reinforcing bar binding machine of the first embodiment. In the below, another example of the operations of binding the reinforcing bars S with the wire W by the reinforcing bar binding machine 1A is described.

In a state where it is detected in step SB1 of FIG. 19B that the first sensor 312L or the second sensor 312R or the first sensor 312L and the second sensor 312R become on as any one or both of the first contact member 9AL and the second contact member 9AR are moved to the actuation position, the control unit 100A detects in step SB2 of FIG. 19B whether the direction detection sensor 350 is on when the direction of the reinforcing bar binding machine 1A is within the predetermined binding allowable range E1.

In the state where it is detected that the first sensor 312L or the second sensor 312R or the first sensor 312L and the second sensor 312R become on, when it is detected that the direction detection sensor 350 becomes on because the direction of the reinforcing bar binding machine 1A is within the predetermined binding allowable range E1, the control unit 100A executes a series of operations of controlling the feeding motor 31 and the twisting motor 80 to bind the reinforcing bars S with the wire W, in step SB3.

In the state where it is detected that the first sensor 312L or the second sensor 312R or the first sensor 312L and the second sensor 312R become on, when it is detected that the direction detection sensor 350 is not in an on state, i.e., the direction of the reinforcing bar binding machine 1A is within the range E2 outside the predetermined binding allowable range and the direction detection sensor 350 is in an off state, the control unit 100A notifies in step SB4 that the binding operation cannot be executed by lighting of a lamp (not shown), a sound and the like.

After notifying that the binding operation cannot be executed, when it is detected that the first sensor 312L and the second sensor 312R become off as the first contact member 9AL and the second contact member 9AR are moved to the standby position and the power supply is cut off and turned on by the operation on the power supply switch 110, the control unit 100A returns to step SB1. Then, when it is detected that the first sensor 312L or the second sensor 312R or the first sensor 312L and the second sensor 312R are in the on state, the direction of the reinforcing bar binding machine 1A is within the predetermined binding allowable range E1 and the direction detection sensor 350 is in the on state, the binding operation is executed.

Alternatively, after notifying that the binding operation cannot be executed, when it is detected that the first sensor 312L and the second sensor 312R become off as the first contact member 9AL and the second contact member 9AR are moved to the standby position, the control unit 100A returns to step SB1. Then, when it is detected that the first sensor 312L or the second sensor 312R or the first sensor 312L and the second sensor 312R are in the on state, the direction of the reinforcing bar binding machine 1A is within the predetermined binding allowable range E1 and the direction detection sensor 350 is in the on state, the binding operation is executed.

Alternatively, after notifying that the binding operation cannot be executed, the control unit 100A returns to step SB1. Then, when it is detected that the first sensor 312L or the second sensor 312R or the first sensor 312L and the second sensor 312R are in the on state, the direction of the reinforcing bar binding machine 1A is within the predetermined binding allowable range E1 and the direction detection sensor 350 is in the on state, the binding operation is executed.

Note that, in the state where it is detected that the direction of the reinforcing bar binding machine 1A is within the range E2 outside the predetermined binding allowable range and the direction detection sensor 350 is in an off state, when it is detected that the first sensor 312L or the second sensor

312R or the first sensor 312L and the second sensor 312R become on as one or both of the first contact member 9AL and the second contact member 9AR are moved to the actuation position, the diverse settings of the reinforcing bar binding machine 1A may be performed by combinations of the on and off states of the first sensor 312L and the second sensor 312R.

Further, in a state where the detection of the direction detection sensor 350 (350A, 350B) is invalidated, the control unit 100A may not execute the binding operation, and may enable the settings of the reinforcing bar binding machine 1A by combinations of the on and off states of the first sensor 312L and the second sensor 312R as a result of operations of the first contact member 9AL and the second contact member 9AR. In addition, in a state where the detection of the direction detection sensor 350 (350A, 350B) is validated, when a direction cannot be detected from the output of the direction detection sensor 350 (350A, 350B), the control unit 100A may determine that a failure occurs in the direction detection sensor 350 (350A, 350B) and issue a notification.

The binding allowable range may also be switched. For example, the reinforcing bar binding machine 1A is provided with the operation unit 111 such as a dial capable of adjusting a binding force, so that the binding allowable range may be switched using the operation unit 111. The binding allowable range may also be switched by combinations of the on and off states of the first sensor 312L and the second sensor 312R as a result of operations of the first contact member 9AL and the second contact member 9AR, the power supply on and off by the operation on the power supply switch 110, and the like. The binding allowable range may also be switched by an operation on the operation unit 111, combinations of the on and off states of the first sensor 312L and the second sensor 312R as a result of operations of the first contact member 9AL and the second contact member 9AR, and combinations of the power supply on and off by the operation on the power supply switch 110. Thereby, the binding allowable range suitable for operation environments and operation sites can be set. For example, settings enabling the reinforcing bars S (binding object) located below, above or laterally with respect to the operator (user) to be bound can be made. The binding allowable range suitable for operation environments and operation sites is set, so that it is possible to suppress binding, which is not intended by the operator (user), and binding at an unfavorable angle with respect to the reinforcing bars S (binding object).

An example of a series of operations of binding the reinforcing bars S with the wire W is described. The feeding motor 31 is rotated in the forward direction and the feeding gears 30 are thus rotated in the forward direction, so that the wire W is fed in the forward direction denoted with the arrow F. The wire W fed in the forward direction by the feeding unit 3 passes through the fixed blade part 60, which is the first regulation member constituting the regulation part 4, and the regulation member 42 that is the second regulation member. The wire W having passed through the regulation member 42 is contacted to the guide surface 51*g* of the first guide 51A and is thus guided to the regulation member 43 that is the third regulation member.

Thereby, the wire W fed in the forward direction by the feeding unit 3 is contacted to the fixed blade part 60, the regulation member 42, the regulation member 43, and the guide surface 51*g* of the first guide 51A and is thus bent into an arc shape. Then, the wire W fed in the forward direction by the feeding unit 3 is contacted to the fixed blade part 60 and the regulation member 43 from an outer periphery direction of the arc shape and is contacted to the regulation member 42 between the fixed blade part 60 and the regulation member 43 from an inner periphery direction of the arc shape, so that a substantially circular curl is formed.

The end portion 51*c* of the first guide 51A and the end portion 52*c* of the second guide 52 are spaced by a predetermined interval in a state where the second guide 52 is moved to the second position. However, in the state where the second guide 52 is moved to the second position, the pair of side guides 52*a* is positioned on the feeding path Wf of the wire W, and the wire W fed in the forward direction by the feeding unit 3 is curled by the regulation part 4, as described above, so that the wire is guided between the pair of side guides 52*a* of the second guide 52.

The wire W guided between the pair of side guides 52*a* of the second guide 52 is fed in the forward direction by the feeding unit 3, so that the wire is guided to the engaging part 70 of the twisting unit 7 by the pair of side guides 52*a* of the second guide 52. Then, when it is determined that a tip end portion of the wire W is fed to a predetermined position, the control unit 100A stops the drive of the feeding motor 31. Thereby, the wire W is spirally wound around the reinforcing bars S.

After stopping the feeding of the wire W in the forward direction, the control unit 100A rotates the twisting motor 80 in the forward direction. The twisting motor 80 is rotated in the forward direction, so that the engaging part 70 is actuated by the actuation part 71 and the tip end-side of the wire W is held by the engaging part 70.

When it is determined that the twisting motor 80 is rotated until the wire W is held by the engaging part 70, the control unit 100A stops the rotation of the twisting motor 80, and rotates the feeding motor 31 in the reverse direction. When the twisting motor 80 is rotated until the wire W is held by the engaging part 70, the motion of the movable member 83 is transmitted to the regulation member 42 by the transmission mechanism 44, so that the regulation member 42 is moved to a position at which it is not contacted to the wire.

When the feeding motor 31 is rotated in the reverse direction, the feeding gears 30 are rotated in the reverse direction, so that the wire W is fed in the reverse direction denoted with the arrow R. While feeding the wire W in the reverse direction, the wire W is wound closely contacted to the reinforcing bars S.

When it is determined that the feeding motor 31 is rotated in the reverse direction until the wire W is wound on the reinforcing bars S, the control unit 100A stops the rotation of the feeding motor 31, and then rotates the twisting motor 80 in the forward direction. The twisting motor 80 is rotated in the forward direction, so that the movable blade part 61 is actuated via the transmission mechanism 62 by the movable member 83 and the wire W is thus cut.

After the wire W is cut, the twisting motor 80 is continuously rotated in the forward direction, thereby rotating the engaging part 70 to twist the wire W.

When it is determined that the twisting motor 80 is rotated in the forward direction until the wire W is twisted, the control unit 100A rotates the twisting motor 80 in the reverse direction. The twisting motor 80 is rotated in the reverse direction, so that the engaging part 70 is returned to the initial position and the held state of the wire W is thus released. Thereby, the wire W binding the reinforcing bars S can be pulled out from the engaging part 70.

When it is determined that the twisting motor 80 is rotated in the reverse direction until the engaging part 70 and the like are returned to the initial position, the control unit 100A stops the rotation of the twisting motor 80.

The operator moves the reinforcing bar binding machine 1A in a direction of pulling out the reinforcing bars S bound with the wire W from the insertion/pulling-out opening 53. When the force of pushing the contact part 91AL of the first contact member 9AL is not applied by the operation of moving the reinforcing bar binding machine 1A in the direction of pulling out the reinforcing bars S from the insertion/pulling-out opening 53, the first contact member 9AL is moved to the standby position by the force of the spring 95AL. In addition, when the force of pushing the contact part 91AR of the second contact member 9AR is not applied, the second contact member 9AR is moved to the standby position by the force of the spring 95AR. Further, the second guide 52 is moved from the second position to the first position by the force of the urging member 54.

The operator's operation of moving the reinforcing bar binding machine 1A in the direction of pulling out the reinforcing bars S bound with the wire W from the insertion/pulling-out opening 53 causes the second guide 52 to move to the first position, so that the interval between the end portion 52*c* of the second guide 52 and the end portion 51*c* of the first guide 51B increases. Thereby, the reinforcing bars S can be more easily pulled out from the insertion/pulling-out opening 53 and moved to a next binding place.

<Operational Effects of Reinforcing Bar Binding Machine of First Embodiment>

In the reinforcing bar binding machine 1A, it is detected by the first sensor 312L that the first contact member 9AL is moved to the actuation position and it is detected by the second sensor 312R that the second contact member 9AR is moved to the actuation position, so that the binding operation is executed. In addition, it is switched whether to execute the binding operation, according to the direction of the reinforcing bar binding machine 1A. Thereby, the handle parts 304*h*L and 304*h*R are not provided with an operation unit, so that an operation is simplified and occurrence of an erroneous operation can be suppressed. Note that, the binding operation may also be executed when any one of the first sensor 312L or the second sensor 312R becomes on, irrespective of the direction of the reinforcing bar binding machine 1A.

In a configuration where the first contact part 13L and the second contact part 13R are attached to the second body part 302 and the first contact member 9AL and the second contact member 9AR are movably supported by the second body part 302, there may be a large tolerance between the attachment positions of the first contact part 13L and the second contact part 13R and the attachment positions of the first contact member 9AL and the second contact member 9AR. In this case, in a state where the reinforcing bars S are butted against the first contact part 13L or the second contact part 13R, the first contact member 9AL or the second contact member 9AR may not be moved to the actuation position. If the first contact member 9AL and the second contact member 9AR cannot be moved to the actuation position, the binding operation cannot be executed.

Therefore, in the reinforcing bar binding machine 1A, the first contact member 9AL and the second contact member 9AR are movably supported by the cover guide part 11 having the first contact part 13L and the second contact part 13R. Thereby, since the moving amounts of the first contact member 9AL and the second contact member 9AR are defined by the cover guide part 11, the moving amounts of the first contact member 9AL and the second contact member 9AR that are moved butting against the reinforcing bars S until the reinforcing bars S reach positions at which the reinforcing bars are butted against the first contact part 13L or the second contact part 13R can be set within a predefined range. Therefore, the first contact member 9AL and the second contact member 9AR can be securely moved to the actuation position.

In addition, since the first sidewall part 11L of the cover guide part 11 to which the first contact member 9AL is attached and the second sidewall part 11R to which the second contact member 9AR is attached are integrally constituted by the connection part 11U, the positional accuracy between the first contact member 9AL and the second contact member 9AR can be improved.

Further, the cover guide part 11 has the shape to cover a portion or all of the end portion on the front side of the second body part 302, portions of both left and right sides on the front side of the second body part 302, and the upper surface of the second body part 302, between the base end-side of the first guide 51A and the base end-side of the second guide 52. While the second body part 302 is made of resin, the cover guide part 11 is made of metal, so that even when the reinforcing bars S are butted, the wear or damage of the second body part 302 can be reduced.

The first guide concave portion 14L1, the second guide concave portion 14L2 and the third guide concave portion 14L3 configured to guide movement of the first contact member 9AL, and the spring 95AL for urging the first contact member 9AL are arranged on the same axis Bx along the moving direction of the first contact member 9AL. Thereby, when a force of tilting the first contact member 9AL with respect to the moving direction of the first contact member 9AL is applied, the first contact member 9AL is suppressed from being tilted, so that the first contact member 9AL can be securely operated. In particular, the first contact member 9AL moved to the actuation position can be securely moved to the standby position by the spring 95AL. The second contact member 9AR is also the same.

When the first cover part 12L is attached to the first sidewall part 11L of the cover guide part 11, the first guide concave portion 14L1, the second guide concave portion 14L2, the third guide concave portion 14L3 and the spring 95AL are covered by the first cover part 12L. Since the third guide concave portion 14L3 has an uneven shape, not the opening, a side of the first cover part 12L is not provided with a large opening. Thereby, dust, wastes and the like are suppressed from being introduced into the mechanism configured to guide the movement of the first contact member 9AL, so that the first contact member 9AL can be securely operated.

In addition, when the second cover part 12R is attached to the second sidewall part 11R of the cover guide part 11, the first guide concave portion 14R1, the second guide concave portion 14R2, the third guide concave portion 14R3 and the spring 95AR are covered by the second cover part 12R. Since the third guide concave portion 14R3 has an uneven shape, not the opening, a side of the second cover part 12R is not provided with a large opening. Thereby, dust, wastes and the like are suppressed from being introduced into the mechanism configured to guide the movement of the second contact member 9AR, so that the second contact member 9AR can be securely operated.

The first cover part 12L can be detached from the first sidewall part 11L by removing the screws 16Lb and 16Lc. When the first cover part 12L is detached, the first contact member 9AL is exposed, so that the first contact member 9AL can be attached and detached to and from the first sidewall part 11L.

The second cover part 12R can be detached from the second sidewall part 11R by removing the screws 16Rb and 16Rc. When the second cover part 12R is detached, the second contact member 9AR is exposed, so that the second contact member 9AR can be attached and detached to and from the second sidewall part 11R.

The first cover part 12L and the second cover part 12R are independent components, so that when detaching the first cover part 12L, it is not necessary to detach the second cover part 12R. When detaching the second cover part 12R, it is not necessary to detach the first cover part 12L. In addition, when attaching and detaching the first contact member 9AL and the second contact member 9AR, it is not necessary to disassemble the second body part 302.

Further, the cover guide part 11 can be attached and detached to and from the second body part 302 without removing the link part 96 from the cover guide part 11 by detaching any one of the first cover part 12L and the second cover part 12R, extracting the positioning pin 16*p* and removing the screw 16Ra. When the cover guide part 11 is detached from the second body part 302, the sensor substrate unit 311 mounted on the sensor attaching part 310 is exposed, as shown in FIG. 12. Thereby, it is possible to perform a maintenance and detection operation on the sensor substrate unit 311.

The link part 96 is attached to the cover guide part 11 via the shaft 96A. Thereby, the tolerance between the attachment position of the link part 96 and the attachment positions of the first contact member 9AL and the second contact member 9AR is suppressed from increasing. In contrast, the second guide 52 is attached to the second body part 302. For this reason, the tolerance between the link part 96 and the second guide 52 is easily affected. Therefore, the opening portion 98B of the connecting part 98, which the acting shaft 98A enters, is made to have a shape larger than the acting shaft 98A, so that the rotatable amount of the link part 96 about the shaft 96A is made larger than the rotatable amount of the second guide 52. Thereby, the first contact member 9AL and the second contact member 9AR can be securely moved up to the actuation position and can be thus detected by the first sensor 312L and the second sensor 312R.

Further, the position of the axis of the rotating operation is different between the second guide 52 and the link part 96. Therefore, the acting shaft 98A is configured to be movable along the receiving part 56, so that the rotation amount of the second guide 52 can be set appropriate with respect to the moving amounts of the first contact member 9AL and the second contact member 9AR.

The first contact member 9AL and the second contact member 9AR are independent components and can be independently actuated. The first sensor 312L configured to detect the first contact member 9AL and the second sensor 312R configured to detect the second contact member 9AR are also independent and can independently detect the movements of the first contact member 9AL and the second contact member 9AR. Thereby, the diverse settings of the reinforcing bar binding machine 1A can be made by combinations of operations of the first contact member 9AL and the second contact member 9AR. For example, in a state where the detection of the direction detection sensor 350 (350A, 350B) is invalidated, the control unit 100A enables the settings of the reinforcing bar binding machine 1A by the combinations of the operations of the first contact member 9AL and the second contact member 9AR, without executing the binding operation.

Figure 20:
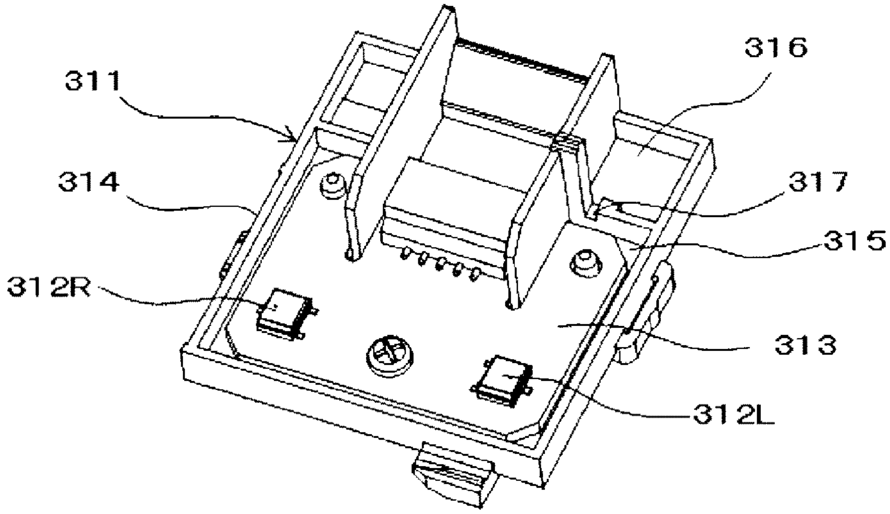
FIG. 20 is a perspective view depicting an example of an operational effect of a sensor substrate unit.

FIG. 20 is a perspective view depicting an example of an operational effect of a sensor substrate unit. In the sensor substrate unit 311, the first sensor 312L and the second sensor 312R are mounted on the same substrate 313. The substrate 313 is accommodated in a first opening portion 315 of a case 314, and the first opening portion 315 is sealed with resin. The case 314 is provided with a second opening portion 316 in the vicinity of the first opening portion 315, and the first opening portion 315 and the second opening portion 316 are connected by a groove portion 317. Thereby, when sealing the first opening portion 315 with the resin, an extra part of the resin flows into the second opening portion 316 through the groove portion 317, so that the first opening portion 315 is sealed with an appropriate amount of the resin.

<Modified Embodiments of Reinforcing Bar Binding Machine>

Figure 21:
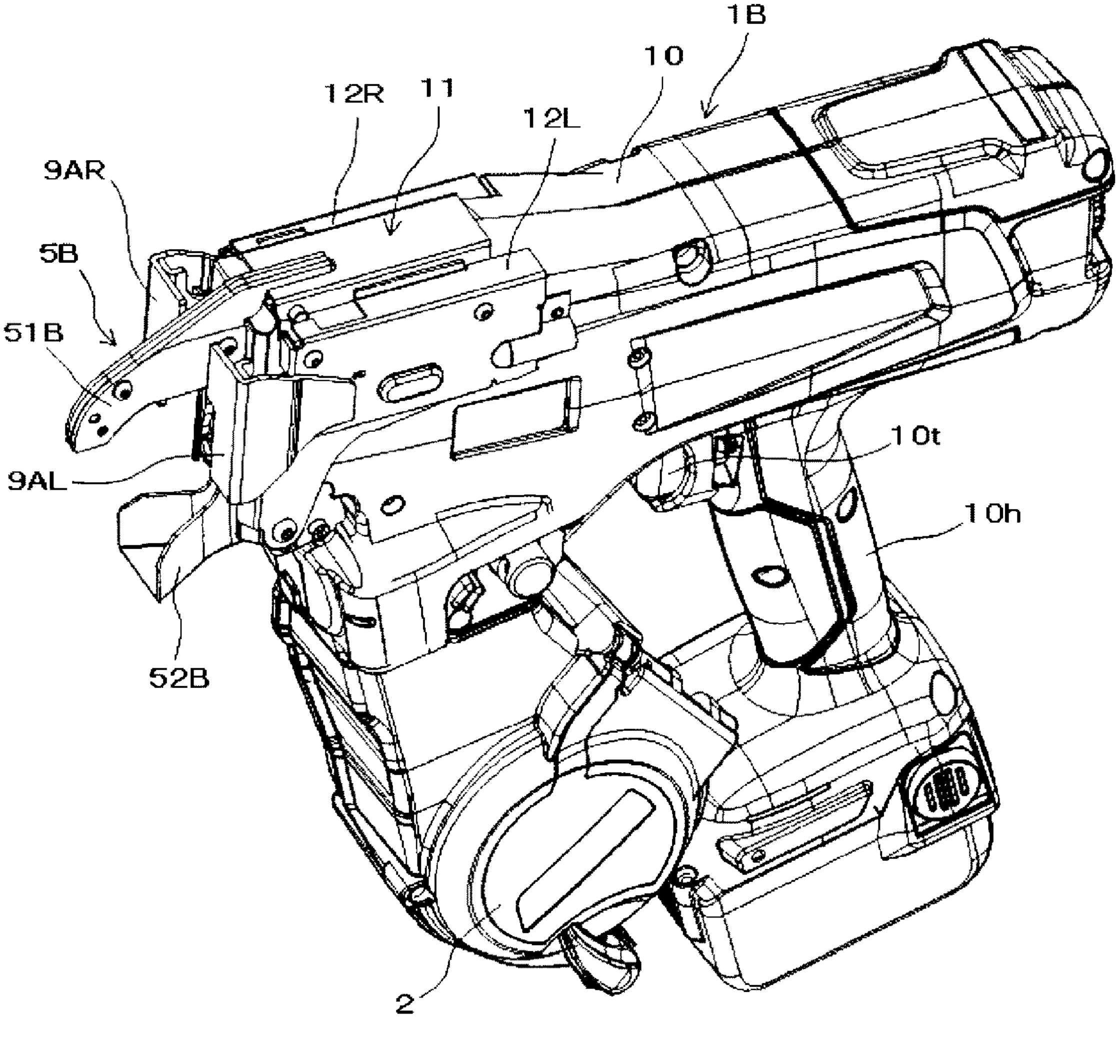
FIG. 21 is a perspective view depicting an example of a reinforcing bar binding machine of a second embodiment.

FIG. 21 is a perspective view depicting an example of a reinforcing bar binding machine of a second embodiment. In a reinforcing bar binding machine 1B of the second embodiment, a guide part 5B having a first guide 51B and a second guide 52B is provided on one side of the body part 10. In the reinforcing bar binding machine 1B, a handle part 10*h* is provided protruding from the other side of the body part 10, and a trigger 10*t* for actuating the reinforcing bar binding machine 1B is provided on a front side of the handle part 10*h*.

The reinforcing bar binding machine 1B includes the first contact member 9AL, the second contact member 9AR, and the cover guide part 11 to which the first contact member 9AL and the second contact member 9AR are movably attached. The first cover part 12L and the second cover part 12R that are attached to the cover guide part 11 are also provided.

The configurations of the first contact member 9AL, the second contact member 9AR and the cover guide part 11 may be similar to the reinforcing bar binding machine 1A of the first embodiment, except that a mechanism configured to actuate the second guide 52B is not provided.

In the reinforcing bar binding machine 1B, the second guide 52B is located at the second position with being urged by a spring (not shown), and can be retreated to the first position when an external force is applied thereto.

Figure 22:
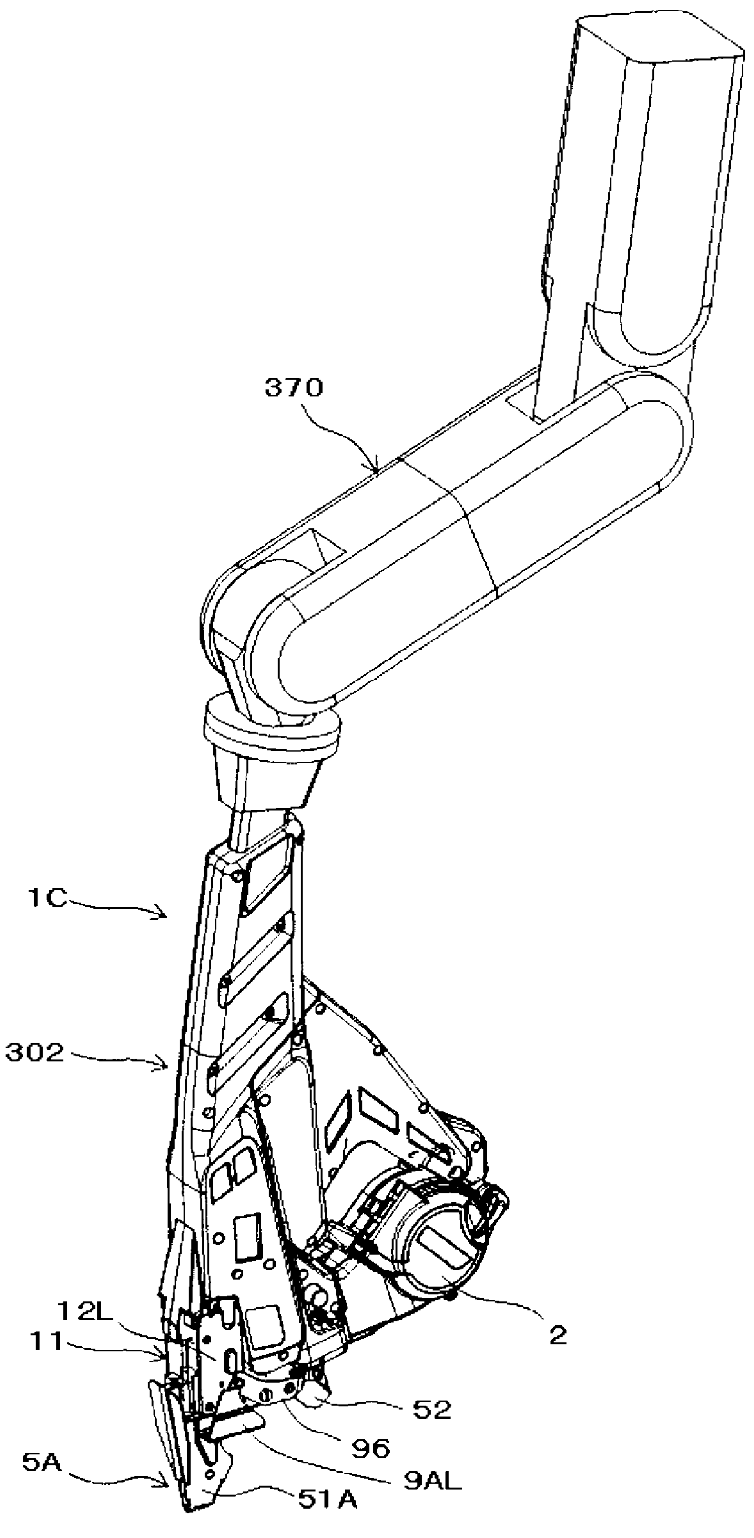
FIG. 22 is a perspective view depicting an example of a reinforcing bar binding machine of a third embodiment.

FIG. 22 is a perspective view depicting an example of a reinforcing bar binding machine of a third embodiment. A reinforcing bar binding machine 1C of the third embodiment has such a configuration that the second body part 302 of the reinforcing bar binding machine 1A of the first embodiment is attached to a robot arm 370.

The subject application is based on Japanese Patent Application Nos. 2018-168247 filed on Sep. 7, 2018, 2018-168248 filed on Sep. 7, 2018, 2018-168249 filed on Sep. 7, 2018, 2018-168250 filed on Sep. 7, 2018, 2018-168251 filed on Sep. 7, 2018, 2018-168252 filed on Sep. 7, 2018, and 2019-156056 filed on Aug. 28, 2019, the contents of which are incorporated herein by reference.

REFERENCE SIGNS LIST

1A, 1B, 1C . . . reinforcing bar binding machine, 301 . . . first body part, 302 . . . second body part, 302L . . . side part, 302R . . . side part, 302U . . . upper surface part, 303 . . . connecting part, 10 . . . body part, 10*h* . . . handle part, 10*t* . . . trigger, 2 . . . accommodation part, 3 . . . feeding unit, 4 . . . regulation part, 5A, 5B . . . guide part, 51A, 51B . . . first guide, 52, 52B . . . second guide, 53 . . . insertion/pulling-out opening, 54 . . . urging member, 56 . . . receiving part, 6 . . . cutting unit, 7 . . . twisting unit, 8 . . . drive unit,

9AL . . . first contact member (movable part), 9AR . . . second contact member (movable part), 90AL, 90AR . . . guided part, 91AL, 91AR . . . contact part, 92AL, 92AR . . . acting part, 93AL, 93AR . . . detection part, 94AL1, 94AR1 . . . first guide convex portion, 94AL2, 94AR2 . . . second guide convex portion, 94AL3, 94AR3 . . . third guide convex portion, 94AL4, 94AR4 . . . spring attaching portion, 95AL, 95AR . . . spring, 96 . . . link part (guide moving part), 96A . . . shaft, 96L, 96R . . . link member, 97L, 97R . . . acted part, 98A . . . acting shaft, 98B . . . opening portion, 98C . . . spring, 11 . . . cover guide part, 11L . . . first sidewall part, 11R . . . second sidewall part, 11U . . . connection part, 12L . . . first cover part (cover part), 12R . . . second cover part (cover part), 13L . . . first contact part, 13R . . . second contact part, 14L1, 14R1 . . . first guide concave portion, 14L2, 14R2 . . . second guide concave portion, 14L3, 14R3 . . . third guide concave portion, 15L1, 15R1 . . . spring support portion, 100A . . . control unit, 110 . . . power supply switch, 111 . . . operation unit, 312L . . . first sensor, 312R . . . second sensor, 350 . . . direction detection sensor, W . . . wire

The invention claimed is:

1. A binding machine comprising:

a body part;

a cover guide part attached to the body part;

a first guide and a second guide extending in a first direction from one end portion of the body part, arranged with an interval, in which a binding object is inserted, in a second direction orthogonal to the first direction, and configured to guide a wire for binding the binding object;

a slider that is abutted against the binding object inserted between the first guide and the second guide and moved from a standby position to an actuation position;

a guide moving part configured to change the interval from a first distance to a second distance shorter than the first distance in response to a movement of the slider to the actuation position;

a sensor that detects a movement of the slider to the actuation position;

a controller configured to cause the binding machine to automatically execute an operation of binding in response to a detection, by the sensor, of the movement of the slider to the actuation position; and a cover part attached to the cover guide part, wherein the cover guide part includes:

a guide configured to movably guide the slider;

a contact part against which the binding object is to be abutted;

a first sidewall part positioned at one side of the body part;

a second sidewall part positioned at another side of the body part; and a connection part connecting the first sidewall part and the second sidewall part, wherein the first sidewall part and the second sidewall part include a moving support point of the guide moving part, wherein one of the guide and the slider includes a guide concave portion, which includes a long hole-shaped opening, which opens in a direction orthogonal to a moving direction of the slider, the guide concave portion including walls on both sides in the moving direction of the slider, the guide concave portion extending in a moving direction of the slider, and the walls extending in the direction orthogonal to the moving direction to restrict the range of movement of the slider in the moving direction, wherein the other of the guide and the slider includes a guide convex portion protruding in the direction orthogonal to the moving direction and inserted into the guide concave portion, the guide convex portion being capable of abutting the walls, wherein the slider covers the cover guide part and a moving amount of the slider is defined by the cover guide part, and wherein the cover part covers the slider, and a guide concave portion and a guide convex portion are provided between the slider and the cover part.

2. The binding machine according to claim 1, wherein the cover guide part covers the body part in at least three directions.

3. The binding machine according to claim 1, wherein the cover part is configured to cover the guide and to be detachably attached to the cover guide part.

4. The binding machine according to claim 1, wherein the guide configured to movably guide the slider comprises a plurality of guides provided at a plurality of positions on the same axis along the moving direction of the slider.

5. The binding machine according to claim 1, wherein the slider comprises a pair of sliders, and the cover guide part is configured so that the pair of sliders can independently move.

6. The binding machine according to claim 1, wherein the cover part covers the guide concave portion.

7. The binding machine according to claim 1, wherein the moving support point of the guide moving part is provided on both of the first sidewall part and the second sidewall part of the cover guide part.

* * * * *